US008268167B2

(12) United States Patent
Dawes et al.

(10) Patent No.: US 8,268,167 B2
(45) Date of Patent: Sep. 18, 2012

(54) SEPARATION APPARATUS AND METHOD

(75) Inventors: Richard Dawes, Selby (GB); Steven Ellis, Hoyland (GB)

(73) Assignee: Safety-Kleen Europe Limited, Dinnington (GB)

( * ) Notice: Subject to any disclaimer, the term of this patent is extended or adjusted under 35 U.S.C. 154(b) by 560 days.

(21) Appl. No.: 11/671,972

(22) Filed: Feb. 6, 2007

(65) Prior Publication Data

US 2007/0181472 A1 Aug. 9, 2007

(30) Foreign Application Priority Data

Feb. 7, 2006 (GB) .................................. 0602409.5
Dec. 22, 2006 (EP) .................................... 06256573

(51) Int. Cl.
*C02F 1/40* (2006.01)
*E02B 15/10* (2006.01)
*E02B 15/00* (2006.01)
(52) U.S. Cl. ..... 210/121; 210/120; 210/519; 210/532.1; 210/538; 210/823; 210/767; 210/776
(58) Field of Classification Search .................. 210/121, 210/120, 519, 532.1, 538–540, 923, 922, 210/767, 776
See application file for complete search history.

(56) References Cited

U.S. PATENT DOCUMENTS

| 617,035 | A | * | 1/1899 | Metcalf | 62/400 |
|---|---|---|---|---|---|
| 2,740,492 | A | * | 4/1956 | Williams | 96/159 |
| 3,722,674 | A | | 3/1973 | Hoppmann et al. | |
| 3,722,687 | A | | 3/1973 | Stebbins et al. | |
| 3,944,489 | A | | 3/1976 | Derzhavets et al. | |
| 4,469,170 | A | * | 9/1984 | Farmer, Jr. | 166/53 |
| 5,714,069 | A | * | 2/1998 | Sager | 210/519 |
| 5,837,152 | A | | 11/1998 | Komistek et al. | |
| 6,254,790 | B1 | * | 7/2001 | King et al. | 210/767 |
| 6,827,853 | B2 | * | 12/2004 | Terrien et al. | 210/238 |
| 2003/0150324 | A1 | | 8/2003 | West | |

FOREIGN PATENT DOCUMENTS

| CN | 2358044 | 1/2000 |
|---|---|---|
| CN | 2584276 | 11/2003 |
| DE | 19509630 | 9/1996 |
| EP | 0569841 | 11/1993 |
| GB | 277310 | 6/1928 |
| GB | 1347775 | 2/1974 |
| GB | 1535058 | 12/1978 |

(Continued)

OTHER PUBLICATIONS

United Kingdom Search Report dated May 24, 2006.

(Continued)

*Primary Examiner* — Nam Nguyen
*Assistant Examiner* — Madeline Gonzalez
(74) *Attorney, Agent, or Firm* — Michael Best & Friedrich LLP

(57) ABSTRACT

Separating apparatus, for separating a substance from a liquid on which the substance can float, comprises: a separation chamber; an inlet adapted to convey a supply comprising the substance and the liquid into the separation chamber; and an outlet adapted to convey liquid collected in the separation chamber out of the separation chamber. The inlet is arranged such that, in use, the supply emerging from the inlet into the chamber is directed upwardly into the chamber, and the apparatus further comprises venting means arranged to convey gas out of the chamber. The apparatus may further comprise a floating pick up connected to a pump for pumping the supply to the separation chamber. In certain examples a non-floating pick up is used, comprising an elongate hollow body with a pick up inlet mouth in the form of a vertical slot extending along a length of the body.

51 Claims, 10 Drawing Sheets

FOREIGN PATENT DOCUMENTS

| | | |
|---|---|---|
| GB | 2089670 | 6/1982 |
| GB | 2129697 | 5/1984 |
| WO | 2004004863 | 1/2004 |

OTHER PUBLICATIONS

Second Office Action from the State Intellectual Property Office of China for Application No. 200710005205.9 dated Aug. 16, 2010 (English Translation—11 pages).

First Office Action from the State Intellectual Property Office of China for Application No. 200710005205.9 (English Translation—7 pages).

European Office Action for Application No. 06256573.4 dated May 17, 2011 (5 pages).

European Office Action for Application No. 06256573.4 dated May 10, 2010 (5 pages).

\* cited by examiner

SEPARATION APPARATUS AND METHOD

RELATED APPLICATIONS

This application claims priority to British Patent Application No. 0602409.5, filed Feb. 7, 2006 and to European Patent Application No. 06256573.4, filed Dec. 22, 2006.

FIELD OF THE INVENTION

The present invention relates in general to apparatus for separating substances from liquids on which the substances can float, and in particular, although not exclusively, to cleaning apparatus known in the art as skimmers, for removing floating contaminants, such as oil, from the surface of another liquid, such as water or an aqueous solution.

BACKGROUND TO THE INVENTION

There are a wide variety of applications in which it is desirable or necessary to separate a floating substance from a liquid. The floating substance may, for example, be another liquid having a lower density. The floating substance may be an unwanted contaminant, or a useful material to be separated from the liquid beneath for use in some application.

Skimmers are a type of separation apparatus widely used in industry to remove floating contaminants, such as oil, from the surface of water or another liquid, such as an aqueous cleaning or coolant solution. Known skimmers typically consist of a pick up, a pump, and a unit in which coalescence or filtration, and then settlement, takes place. This is typically carried out in a small tank or in a small drum modified for the purpose. A typical coalescence unit, as used in prior art skimmers, is shown highly schematically in FIG. 1. A supply of dirty coolant (i.e. containing contaminant oil) is provided to the intake, which directs this supply downwards into a coalescing cartridge contained in a drum. This cartridge extracts the contaminant oil, and relatively clean coolant is extracted via an outlet fed from the bottom of the drum. A problem with such skimmers is that, as they rely on coalescence techniques to improve separation of the oil and water, they can block with fine solids and require changing or cleaning. The time between cleaning or changing is difficult to gauge.

Known alternatives to skimmers using coalescence techniques are units that rely on hydrophobic ropes, belts or discs. Generally, however, these units are hard to maintain and do not work successfully over a prolonged period.

Another known form of separation apparatus is shown in FIG. 2. A supply comprising oil, water, and solids is supplied via an inlet into a separation chamber, to emerge within the body of water already collected in the chamber. Oil rises to the surface, and is tapped off via an outlet, and solids accumulate at the bottom of the chamber. Water is extracted from the side of the chamber. A problem with such an arrangement is that injection of the supply causes churning which impedes the separation process. This is a particular problem if the supply also comprises a large amount of entrained air. Therefore, in the past, there has been motivation to keep the amount of entrained air in the supply to a minimum.

It is therefore an object of embodiments of the present invention to provide separation apparatus and techniques which overcome, at least partially, one or more of the problems associated with the prior art. Particular embodiments aim to provide improved skimming apparatus.

SUMMARY OF THE INVENTION

According to a first aspect of the present invention, there is provided a separating apparatus for separating a substance from a liquid on which the substance can float. The apparatus includes a separation chamber, an inlet adapted to convey a supply comprising the substance and the liquid into the separation chamber, and an outlet adapted to convey liquid collected in the separation chamber out of the separation chamber. The inlet is arranged such that, in use, the supply emerging from the inlet into the chamber is directed upwardly into the chamber. The apparatus further comprises venting means arranged to convey gas out of the chamber.

The substance may, for example, be another liquid of lower density, or some other material, such as particles of a low density solid. The supply to the chamber may comprise a substantially homogeneous mixture of the substance and liquid, or alternatively the substance and liquid components may already be separated to a certain degree.

By directing the supply upwardly into the chamber, settling and separation is facilitated, especially if the supply also contains a substantial quantity of entrained gas, such as air. The vent means allows this gas to escape the chamber, rather than being retained.

In certain embodiments, the inlet comprises a mouth, out of which the supply emerges into the separation chamber, and that mouth faces upwardly. The mouth may be arranged in an upper portion of the separation chamber.

Upwards injection of the supply into an upper portion of the chamber provides the advantage that churning of any liquid already collected in the chamber is reduced.

In certain embodiments the chamber is provided in a vessel having a top, defining an upper extent of the chamber, and a base, defining a lower extent of the chamber, and the mouth is arranged proximate the top.

The outlet may be arranged to extract liquid from a lower portion of the chamber, and this helps retain the floating substance in the chamber. The outlet may comprise a downward facing mouth, through which liquid is extracted from the chamber, and that outlet mouth is arranged proximate the base in certain embodiments.

Preferably, the inlet and venting means are arranged such that there is no straight-line path by which material emerging into the chamber from the inlet may be conveyed out of the chamber via the venting means. This helps reduce the quantity of substance and liquid escaping the chamber via the vent.

Certain embodiments, and in particular certain skimmers embodying the invention, comprise a drum, and the separation chamber is provided by an interior volume of the drum (i.e., a volume enclosed by the drum). In certain embodiments, the drum is a cylindrical, tight-head steel drum.

The drum may have a base, on which the drum stands in use, and a top, and in certain embodiments the inlet is arranged to convey the supply down through the drum top and into the separation chamber. The inlet may comprise a U-shaped conduit arranged to convey the supply downwardly from the drum top and then to divert the supply back upwards towards the top.

The inlet in certain embodiments is arranged to direct the supply emerging from the inlet into the chamber at an underside of the drum top. This arrangement facilitates separation of the supply into its component parts, especially the disengagement of entrained air from the liquid.

In embodiments utilising drums, the outlet is preferably arranged to convey liquid up through the drum top and out of the separation chamber. The outlet may, for example, comprises a conduit extending downwardly from the drum top into the separation chamber, and the outlet conduit may have a mouth, through which liquid may be extracted from the chamber, proximate the drum base. The outlet mouth in certain embodiments faces downwards, and the outlet conduit comprises a vertical pipe.

Again in drum-based embodiments, the venting means is preferably arranged to convey gas up through the drum top.

Certain embodiments also comprise a pump arranged to pump the supply into the separation chamber via the inlet. Preferably, the pump is a roller pump, although other pump types may be used. Roller pumps have been found to be particularly suitable for pumping a supply comprising large amounts of entrained air.

The apparatus may further comprise a pump controller arranged to operate the pump according to a cycle comprising an on period and an off period. The off period in certain embodiments is longer than the on period. The pump controller may comprises means for adjusting the relative lengths of the on and off periods and/or means for adjusting the frequency of the cycle. Intermittent operation provides the advantage that a high capacity pump may be used, whilst allowing suitable settling times between successive injections of supply into the chamber. The liquid in the chamber is thus not constantly churned. The pump controller may be programmable, and/or comprise a simple manual means for adjusting the pump operation cycle.

Certain embodiments further comprise a floating pick up connected to the pump and adapted to float on a body of liquid, the floating pick up having an inlet mouth through which the pump can draw the supply. This arrangement is particularly suited to skimming apparatus. The floating pick up preferably comprises means for adjusting a height of the inlet mouth relative to the surface of a body of liquid on which the pick up floats, and the floating pick up is preferably adapted to permit the pump to draw in a substantial quantity of air. This can be achieved if the float is adjusted relative to the pick up mouth to lift that mouth partially above the surface of the floating contaminant.

In certain alternative embodiments, a non-floating pick up is used. This may, for example, be a pick up or pick up structure arranged to draw the supply from a fixed location or locations in a supply tank, sump, chamber or other vessel.

Certain embodiments further comprise a pick up connected to the pump and through which the pump can draw the supply, the pick up comprising: a pick up chamber; a pick up inlet mouth adapted to admit the supply into the pick up chamber; and a pick up outlet mouth adapted to convey the supply from the pick up chamber to the pump. The pick up may be floating, but in alternative embodiments the pick up may be non-floating. It may be arranged at a fixed height, such that the liquid level may change with respect to the position of the inlet mouth. Adjustment means may be provided, so that the pick up inlet mouth may be fixed at various heights and/or orientations.

In certain embodiments the pick up inlet mouth comprises a slot, and this advantageously may provide a sufficient restriction for material flowing into the pick up chamber such that when the pump is operated the fluid level inside the pick up chamber is lower than the level outside. This encourages floating material to flow down into the pick up chamber, for subsequent extraction by the pump.

Advantageously, the pick up may be adapted such that, in use, the slot extends vertically. Thus, for a range of liquid levels the slot can still provide a restricted channel for floating material to flow into the pick up chamber for extraction.

In certain embodiments the pick up is adapted such that, in use, the pick up outlet mouth is proximate a lower end of the slot. Such arrangements are particularly suited for use in the extraction of a supply from a shallow reservoir, sump, or other such containment arrangement.

Conveniently, the pick up outlet mouth may be substantially circular. In combination with a narrow pick up inlet mouth slot, a suitably sized outlet mouth can advantageously provide a pick up that may be emptied (by appropriate pumping) faster than it fills, Again, this encourages flow of floating material into the pick up chamber.

The separating apparatus may further comprise: a reservoir adapted to hold a quantity of the liquid and substance; and a partition arranged to separate the reservoir from the pick up chamber. The pick up inlet mouth may then comprise an aperture in the partition. Thus, in certain examples, the pick up chamber and reservoir may be provided by respective portions of a common tank or structure, with partition means separating them.

In alternative embodiments, however, the pick up comprises a hollow body and the pick up chamber is a volume inside said body (e.g. a volume defined by an inside surface of the body).

In certain embodiments the hollow body is elongate. The pick up inlet mouth may comprise a slot extending along the body from a position proximate a first end of the hollow body. The pick up outlet mouth may be arranged proximate the first end, and this, together with the slot inlet, provides a pick up structure particularly suitable for drawing a supply from a shallow body of liquid.

In certain embodiments the first end of the hollow body is closed, and this provides the advantage that it prevents liquid from being drawn straight up into the pick up chamber, as would be the case if the first end were open. Typically, the first end will be immersed in relatively "clean" liquid, beneath the layer of floating substance on top. Utilising a closed end inhibits uptake of the relatively clean liquid, and enables the pick tip to function more efficiently with regard to removal of any floating material.

The pick up may further comprise support means for supporting the hollow body in a reservoir such that said first end is lowermost and the body extends substantially vertically from said first end. The support means may comprise adjustment means for adjusting a height at which the hollow body is supported in the reservoir.

In certain embodiments the hollow body is tubular. In certain embodiments the tubular body has a generally rectangular cross section, the pick up inlet mouth comprises a slot in one face of the tubular body, and the pick up outlet mouth comprises an aperture in an adjacent face of the tubular body. Advantageously, this enables the pick up to be installed close to a side wall of a reservoir (receptacle, tank, vessel, sump etc) with the inlet mouth facing away from the wall, toward the body of collected liquid.

Certain embodiments further comprise a reservoir adapted to hold a quantity of the liquid and the substance, and the pump is arranged to pump the supply to the separation chamber from the reservoir. The reservoir may be a holding tank or vessel, provided to enable a degree of pre-separation of the substance and liquid to take place, before supply to the main separating chamber. By using such a holding tank and a floating pick up, extraction of the floating substance, and its retention in the chamber, is facilitated.

The apparatus may further comprise a return conduit, connected to the outlet and arranged to convey liquid back into the reservoir. The apparatus may also comprise a further pump arranged to pump liquid out of the separation chamber to the reservoir, via the outlet and return conduit. Alternatively, liquid may be driven out of the separation chamber solely by means of pressure within the separation chamber (i.e. pressure in the volume above the collected liquid and substance). Conveniently, this pressure may be developed as a result of the injection of the supply into the chamber by the supply pump. Although the venting means allows gas to exit the chamber, if the venting means is appropriately arranged (for example if it comprises a conduit having sufficiently small bore, or comprises a suitable constriction or other flow limiting structure or device) then the restriction it imposes on the flow of gas out of the chamber can enable a sufficiently elevated pressure (i.e. sufficiently above atmospheric pressure) to be developed to drive liquid out of the outlet, for example up and out of an outlet comprising a vertical pipe, and along a return line to a supply source.

In certain embodiments, and in particular in certain skimmers embodying the invention, the apparatus includes a further separation chamber and a further inlet connected to the venting means and adapted to convey gas and any entrained substance or liquid conveyed out of the separation chamber by the venting means into the further separation chamber to emerge in an upper portion of the further separation chamber. A first outlet is adapted to convey liquid collected in a lower portion of the further separation chamber out of the further separation chamber and a second outlet is adapted to convey gas from an upper portion of the further separation chamber, out of the further separation chamber.

Thus, the apparatus may comprise an air/oil/water separator arranged to trap and separate oil and water escaping via the venting means from the main separation chamber.

The first outlet may have a mouth arranged in communication with the lower portion of the further separation chamber, and the first outlet may be adapted to inhibit flow of collected liquid out of the further separation chamber until the head of collected liquid and substance above the mouth exceeds a predetermined value.

The first outlet may comprise a inverted U-shaped conduit, having a downward facing mouth in communication with the lower portion of the further separation chamber and through which fluid can be conveyed out of the chamber.

In certain embodiments, the first outlet and second outlet from the further separation chamber are connected to the outlet from the first separation chamber.

According to another aspect of the invention there is provided an apparatus for separating a supply comprising a gas, a substance, and a liquid on which the substance can float. The apparatus includes a separation chamber, an inlet adapted to convey the supply into the separation chamber to emerge in an upper portion of the chamber, a first outlet adapted to convey liquid collected in a lower portion of the separation chamber out of the separation chamber, and a second outlet adapted to convey gas from an upper portion of the chamber, out of the chamber. The first outlet has a mouth arranged in communication with said lower portion of the chamber, and the first outlet is adapted to inhibit flow of collected liquid out of the separation chamber until the head of collected liquid and substance above the mouth exceeds a predetermined value. In other words, it inhibits flow until the pressure at the mouth exceeds a predetermined value. This pressure is determined by the depth and composition of the body of material collected above the mouth. Typically, this body of material will comprise a depth of the liquid and a layer of the substance floating on top. It may also comprise a mixed portion, while fresh supply is being conveyed into the chamber, or if only a brief time has elapsed since a previous injection of supply material. Such apparatus can be used, for example, as an oil trap on a gas vent, or as an air/oil/water separator for attachment to the vent of skimming apparatus embodying the first aspect of the invention.

The first outlet may comprises a conduit extending upwardly from the mouth to a first level, that first level being below a level at which the supply emerges from the inlet and below a level at which gas enters the second outlet. Conveniently, the first outlet may comprise an inverted U-shaped tube. The tube may have a mouth inside the chamber, and may convey fluid upwardly from the mouth and then downwardly out of the chamber, through a base of the chamber.

Another aspect of the invention provides a pick up for connection to a pump and through which the pump can draw a supply comprising a substance and a liquid on which the substance can float. The pick up includes an elongate hollow body, a pick up chamber inside the hollow body, a pick up inlet mouth adapted to admit said supply into the pick up chamber, and a pick up outlet mouth adapted to convey said supply from the pick up chamber to the pump. The pick up inlet mouth comprises a slot extending along a length of the hollow body.

Another aspect of the invention provides a floating pick up for connection to a pump and through which the pump can draw a supply comprising a substance and a liquid on which the substance can float. The pick up includes at least one float, an inlet coupled to the at least one float and having an inlet mouth through which the pump can draw said supply, and adjustment means for adjusting a height of the inlet mouth relative to the surface of a body of liquid on which the pick up floats.

This floating pick up may, of course, be incorporated in separating apparatus embodying another aspect of the invention. The adjustment means in certain embodiments is arranged to provide adjustment of the inlet mouth position relative to the float or floats. Certain embodiments comprise a pair of floats, with the inlet arranged in between them. Preferably, the adjustment means comprises coarse adjustment means and fine adjustment means adapted to provide relatively coarse and relatively fine adjustment respectively of the height of the mouth relative to the liquid surface. In certain embodiments the float(s) and inlet are attached to a common support member, or yoke, with coarse adjustment being provided by means for connecting the float(s) to the support at a plurality of discrete positions. Fine adjustment may be provided by means of a screw thread (e.g. by means of an internally threaded cylindrical inlet member being mounted on an externally threaded nipple, that nipple being rigidly fixed to the yoke).

In certain embodiments the floating pick up further comprises a pick up outlet comprising connection means for connecting a conduit via which the pump can draw the supply from the pick up, the connection means extending generally transversely to the inlet, such that when a generally horizontal conduit is connected to the connection means when the pick up is floating the inlet is directed generally vertically. Advantageously, such an arrangement enables the pick up mouth to be set at, and then maintained at, a position just below the nominal surface level of liquid on which the pick up floats, with the mouth facing upwards. When a connected pump is then operated, floating material can thus be drawn down into the inlet mouth over the full 360 degree range around the mouth.

In alternative embodiments, the connection means may be arranged to extend generally in line with the inlet, such that when a generally horizontal conduit is connected to the connection means when the pick up is floating the inlet is directed generally horizontally. Advantageously, this enables the pick up inlet mouth to be set at, and maintained at, a position such that it is partially above and partially below the liquid surface, thereby enabling the attached pump to draw in an appreciable quantity of air together with liquid and floating material. This arrangement is particularly suited to drawing a supply from a shallow body of liquid.

Preferably, the connection means is adapted to permit relative rotation between the float and inlet assembly and a connected conduit. Advantageously, this allows the float and inlet assembly to self-level when the conduit is attached.

Another aspect of the invention provides a method of separating a substance from a liquid on which the substance can float. The method includes injecting a supply comprising the substance and liquid upwardly into a separation chamber, allowing the supply to settle in the chamber, such that the liquid collects in a lower portion of the chamber and the substance floats on top of the collected liquid, extracting the collected liquid from the lower portion of the chamber, and venting gas out of the chamber.

The method may comprise further features analogous to the features described above with reference to apparatus embodying the invention.

BRIEF DESCRIPTION OF THE DRAWINGS

Embodiments of the invention will now be described with reference to the accompanying drawings (not to scale).

DETAILED DESCRIPTION OF PREFERRED EMBODIMENTS

Figure 3:
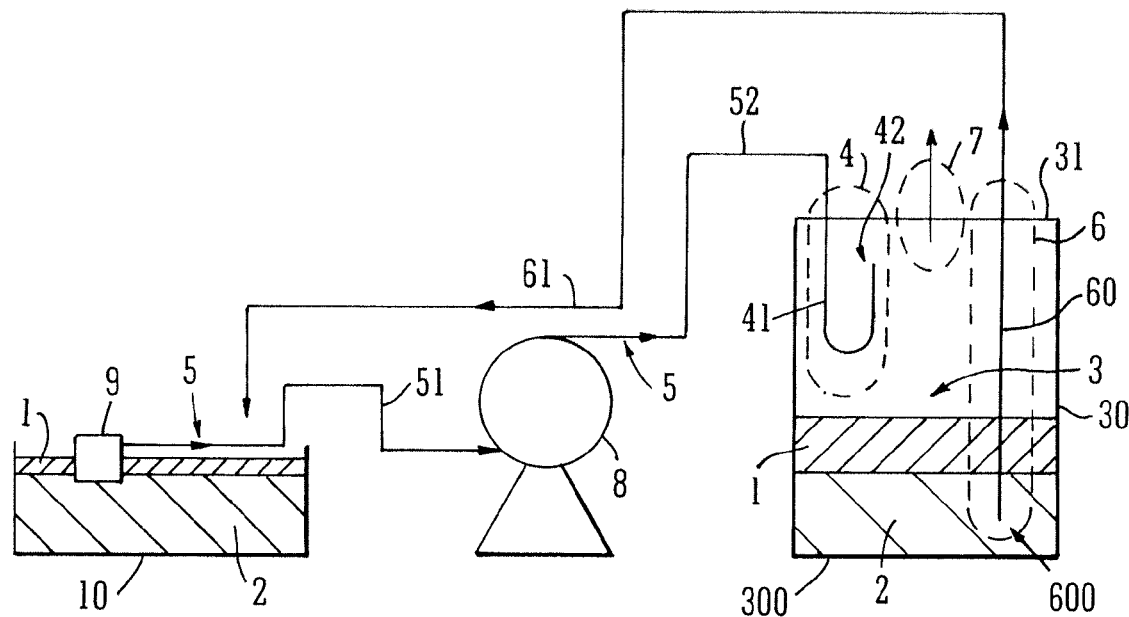
FIG. 3 is a schematic representation of separating apparatus embodying the invention.

Referring now to FIG. 3, a separating apparatus (which may also be referred to as a separating system) embodying the invention comprises a drum 30 whose interior volume defines a separating chamber 3. The drum is closed by a head 31 (which may also be referred to as a lid or top) which is non-removable in this example. An inlet 4 is attached to the head 31 which provides a passage for material into the separation chamber 3. In other words the inlet is adapted to convey a supply 5 of material into the drum for separation. In this example the supply 5 into the drum 30 comprises a mixture of oil 1 and water 2. The apparatus includes a pump 8 arranged to pump this supply 5 to the inlet 4 from a sump 10. A quantity of oil 1 and water 2 has collected in this sump 10, with the oil 1 forming a layer floating on top of the water 2. The apparatus also comprises a floating pick up 9 connected to the pump 8 by means of a suitable conduit 51. This floating pick up 9 is arranged such that when the pump 8 operates it draws floating oil 1 into the conduit 51, together with a quantity of water from the body of water beneath the floating oil, and a quantity of air. Thus, it will be appreciated that the supply 5 provided to the separation chamber in addition to the oil and water, includes a quantity of entrained air. The pump 8 provides the supply 5 to the inlet 4 by means of another conduit 52 (which of course may be easily be provided by a length of pipe, for example). The inlet 4 comprises a generally U-shaped conduit 41 which extends downwardly from the top 31 of the drum and then back upwards again such that its exit mouth 42 faces in a generally upwards direction. Thus, as the supply mixture of oil, water, and air is pumped into the separation chamber 3 through the inlet 4, that mixture is directed upwardly into the chamber towards the top 31, as it emerges from the mouth 42 of the inlet 4. This arrangement is advantageous as it provides rapid disengagement of entrained air from the mixture and gentle settling of the oil and water. In other words, it facilitates the separation of the mixture into its component parts. One factor in this is that by injecting the supply mixture upwardly into an upper region of the separation chamber, churning of liquid already collected in a lower portion of the chamber is minimised or at least reduced compared with the situation that would exist if the mixture were injected directly into the collective body of fluid or directed downwardly through the surface of the collective body of liquid. As shown in FIG. 3, a quantity of water 2 has collected in a lower portion of the chamber 3 and a relatively thick layer of oil 1 has accumulated on top. To remove the collected water 2 from the chamber 3 an outlet 6 is provided. This outlet 6 conveys the clean liquid 2 from the bottom of the drum 30 via a return line 61 back into the sump 10. In this example the outlet 6 comprises a vertical stand pipe 60 having a mouth 600 in communication with a lower portion of the separation chamber 3 and extending upwardly through the drum lid 31 to connect to the return line 61. By arranging the stand pipe mouth 600 proximate to the base 300 of the drum 30 and by arranging the inlet 4 to direct the supply mixture upwardly into the chamber from a position proximate to the top 31 of the drum 30, this and other embodiments of the invention provide the advantage that only substantially clean water to (i.e. not containing droplets of oil 1) is returned to the sump 10. Equivalently, substantially all of the oil 1 extracted from the surface of the water 2 in the sump 10 is retained in the drum 30 and is not recycled to the sump 10. The separating apparatus also comprises a vent 7 arranged to convey gas out of the separation chamber, in this example via the drum top 31. The vent 7 does, however, place a restriction on the flow of gas out of the chamber, and injection of the supply 5 into the chamber 3 by the pump 8 results in a pressure being developed in the chamber space above the collected substance 1 and liquid 2, that pressure being sufficient to drive liquid 2 up and out of the outlet 6 and back along the return line 61 to the sump 10. Thus, the arrangement provides the advantage that a single pump 8 is able to both pump the supply from the sump to the chamber for separation, and return separated, clean liquid 2 back to the source.

It will be appreciated that operation of the apparatus or system shown in FIG. 3 results in progressive removal of the floating layer of oil 1 from the sump, with the removed oil being retained in the drum 30. The apparatus can therefore also be described as cleaning apparatus or a cleaning system. The sump 10 may, for example, be the sump of a piece of machinery such as a lathe or milling machine, in which case the liquid 2 described above as water may in fact be a coolant solution.

It will also be appreciated that while the apparatus of FIG. 3 has been described with reference to the separation of a layer of floating oil 1 from a body of water 2, similar apparatus embodying the apparatus may be used to separate a wide range of substances from liquids upon which those substances float. For example, such apparatus could be used to separate two organic liquids, or alternatively could be used to remove a contaminant layer comprising low-density particles of a solid material from the surface of a liquid. Embodiments of the invention could also be used to remove floating spillages from the surface of liquids, with the floating spillage material again being retained in the separation chamber 3.

Other applications of embodiments of the invention will be apparent to the skilled person.

Also, it will be appreciated that whilst the embodiment described above with reference to FIG. 3 utilised a supply 5 from a sump 10 in which separation of the floating substance (oil 1) from the liquid (water 2) had already taken place, in alternative embodiments the supply need not be taken from such a source. For example, the supply could be taken from a mixed body of liquid and floating substance, and separation of this mixture into its component parts may then still take place in the separating chamber.

Also, it will be appreciated that whilst in certain embodiments the sump 10 described above may be the sump of a piece of machinery, in alternative embodiments item 10 may be a reservoir that is part of the separating apparatus itself. It may, for example, be a holding tank arranged to receive the liquid and floating substance (perhaps in a mixed form). In such an arrangement, the tank may thus provide an additional vessel in which separation of the floating substance and liquid can take place. Then, by using the floating pick up 9 the proportion of the floating material in the supply pumped into the separation chamber is increased, and the total volume of material that has to be pumped in order to remove substantially all of the floating contaminant from the tank is reduced.

Figure 4:
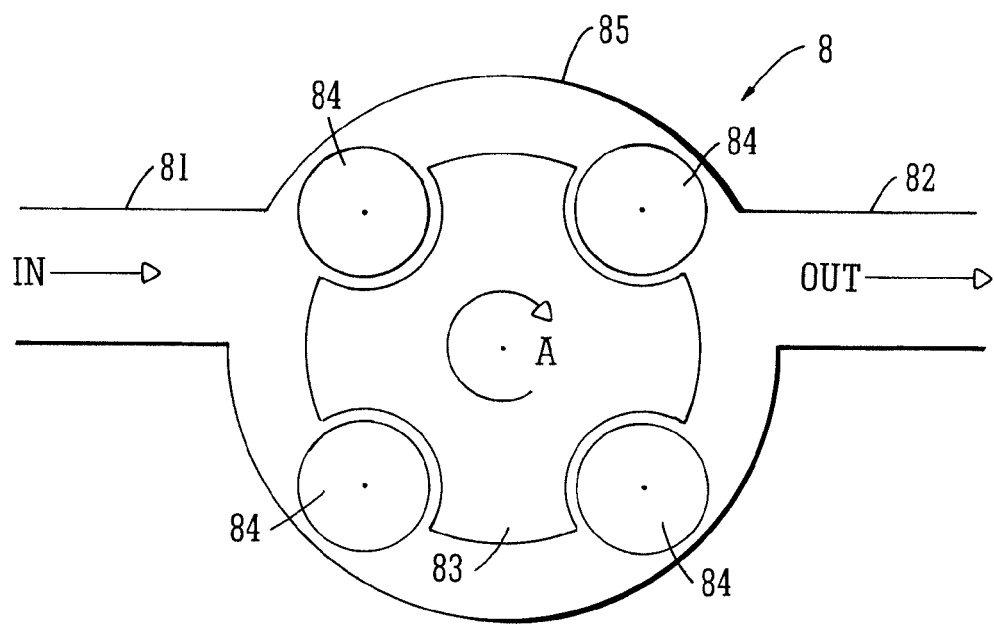
FIG. 4 is a schematic representation of a roller pump suitable for use in embodiments of the invention.

Referring now to FIG. 4, this is a highly schematic representation of a roller pump 8 which may be used in embodiments of the invention to pump the supply 5 to the inlet 4 to the separation chamber 3. This pump comprises a housing 85 in which a rotor 83 is arranged to rotate. The rotor carries a plurality of rollers 84, each of which rotates about its axis and engages the inner surface of the housing as it is conveyed around a circular path by the rotor 83. By rotating the rotor in the direction shown by arrow A in the figure, supply material is pumped from the inlet 81 to the outlet 82. This arrangement of pump has been round to be particularly suited to use in embodiments of the invention for pumping a supply to the separation chamber, that supply comprising a large proportion of entrained air.

Figure 5:
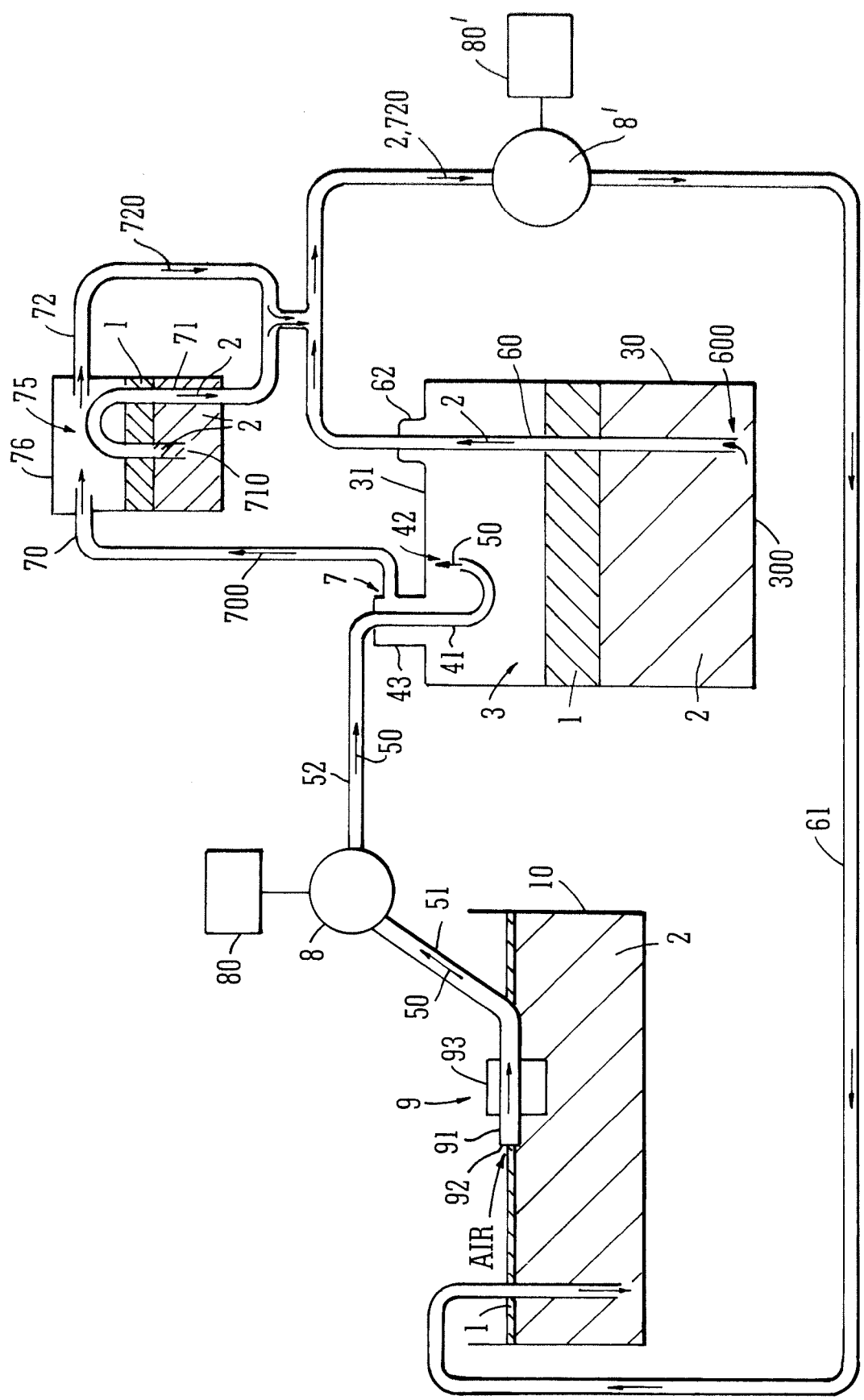
FIG. 5 is a schematic representation of a separation system in accordance with another embodiment of the invention.

Referring now to FIG. 5, this is a highly schematic representation of another separation (or extraction) system embodying the invention. It may also be described as skimmer apparatus. The apparatus comprises a holding (or pre-separating) tank 10 to which a supply of contaminated liquid has been provided. This contaminated supply has separated into a body of relatively clean liquid 2 and a floating layer of contaminant substance 1. A floating pick up 9 is arranged to float on the liquid collected in the tank. This pick up 9 comprises a pick up inlet 91 having an inlet mouth 92, and a float 93 adjustably connected to the pick up inlet 91. By adjusting the float 93 relative to the pick up inlet 91 the position of the mouth 92 relative to the surface of the contaminant layer 1 and body of liquid 2 can be adjusted. In this example, the mouth 92 is arranged in communication with air above the floating layer 1, the floating layer itself, and the body of liquid 2 beneath. The mouth 92 is set relatively high with respect to the upper surface of the floating layer so that when the pump 8 to which the floating pick up 9 is connected is operated, the supply mixture drawn into the pick up 9 and pumped to the separation chamber 3 contains a large proportion of entrained air. In this embodiment the pump 8 is a roller pump, and the apparatus further comprises a pump controller 80 arranged to control operation of the pump 8. The controller 80 is arranged to operate the pump 8 according to a repeated cycle. For a portion of the cycle the pump operates to drive the mixture 50 through the inlet 4 into the separation chamber 3, and for the remainder of the cycle the pump 8 does not operate. In certain embodiments the controller 80 is adapted such that the proportion of the cycle for which the pump operates can be adjusted. The duration of the cycle and the relative lengths of the on and off periods of pump operation may, of course, be adjusted to suit requirements. Just as one example, the cycle may in certain embodiments have a 130 second duration, with the on time being 40 seconds, and the off time beings 90 seconds.

Intermittent operation of the pump in this manner provides the advantage that the body of liquid 2 and contaminant 1 collected in the separating chamber 3 is not constantly being disturbed or churned, as would be the case if the pump were arranged to operate continuously. Advantageously, the off time of the pump 8 enables the liquid 2 and contaminant 1 in the separation chamber 3 to settle. The apparatus further comprises a second pump $8^1$ controlled by another controller $80^1$ to pump clean liquid 2 out of the separation chamber 3 via the outlet 6. In certain embodiments, this second controller $80^1$ is arranged to control the pump $8^1$ such that it runs only during the off periods of the supply pump 8. The controllers 80 and $80^1$ may thus be synchronised such that there is a predetermined delay between switching the supply pump 8 off and switching the return pump $8^1$ on to ensure that the liquid and contaminant in the chamber 3 are adequately settled before liquid is pumped back to the holding tank 10. This helps to ensure that once surface contaminant 1 has been drawn from the tank 10 into the separating chamber 3, it is not returned to the tank 10. It will be appreciated that although FIG. 5 shows the controllers 80 and $80^1$ as separate controllers, in alternative embodiments a single, appropriately arranged controller may be used to control the operation of both the supply and return pumps.

As with the apparatus of FIG. 3, the supply pump 8 provides the supplied mixture 50 to the separation chamber inlet by means of a suitable conduit 52. The separation chamber 3 in this example is again the interior of a drum 30 having a non-removable top 31 and a sealed bottom 300. A fixture 43 is attached to the top 31 and the inlet comprises a tube 41 which extends down through this fixture, through the drum top 31, into an upper portion of the separation chamber 3 before bending round such that the mouth 42 of the inlet from which the supplied mixture emerges into the separation chamber 3 faces upwards (i.e. it faces the underside of the drum top or lid 31). Thus, supplied mixture 50 emerging from the mouth 42 is directed upwardly into the upper portion of the chamber, at a position proximate to the lid. A vent 7 is provided by the fixture 43, that vent permitting air or other gas to escape from the drum 30. This vent arrangement is particularly important in this example as the floating pick up has been arranged such that the supply mixture 50 comprises a large proportion of entrained air. The vent 7 and inlet or mouth 42 are arranged in this example so that there is no direct line of sight between them, to reduce the amount of liquid 2 and contaminant 1 escaping via the vent 7. However, even with this arrangement a small amount of liquid and contaminant may be carried with the venting gas/air and it is desirable not to simply return that liquid and contaminant to the tank 10 for re-processing. Accordingly, the separation apparatus of FIG. 5 comprises a further separation chamber 75 provided in a housing 76 and having a first inlet 70 arranged to convey the air/liquid/contaminant mixture 700 from the vent 7 into the further separating chamber 75, to emerge in an upper portion of that chamber 75. The liquid 2 and contaminant 1 in the supply 700 from the vent 7 collect in the further separating chamber 75, the contaminant 1 forming a layer floating on the body of liquid 2. A first outlet 71 is arranged to convey clean liquid 2 collecting a lower portion of the further separation chamber 75 out of the separation chamber, and a second outlet 72 is arranged to convey gas out of an upper portion of the further chamber 75. The first outlet 71 is adapted to inhibit flow of clean liquid 2 out of the further separation chamber until the pressure at its mouth 710, which is in communication with the lower portion of the further chamber 75, exceeds a predetermined value. In this embodiment this is achieved by the first outlet 71, comprising an outlet pipe in the form of an inverted U-shaped. This pipe has a mouth 710 which faces downward and is arranged proximate to a bottom of the further separation chamber 75. The pipe extends upwardly from that mouth 710 to a height below the levels of the inlet 70 and the second outlet 72 and then turns through 180 degrees and extends downwardly through the bottom of the housing 76. Thus, the first outlet 71 can be regarded as comprising a siphon or siphonic conduit. The outlet 71 may also be described as a siphonic outlet. It will be appreciated that once the mouth 710 of the outlet 71 has become immersed in clean liquid 2, in general it will not be possible for contaminant 1 to enter the outlet mouth 710 as the relatively small quantities of contaminant and liquid 2 contained in the supply 700 from the vent 7 will not appreciably disturb the surface of the collected material. Thus, as more fluid 2 and contaminant 1 enters the further separation chamber 75, the combined height of collected fluid 2 and contaminant layer 1 above the mouth 710 will gradually increase, and clean liquid 2 will rise up inside the arm of the inverted U-tube as shown in FIG. 5. The height of the liquid 2 inside the tube will generally be slightly lower than the surface of the contaminant layer 1 as that layer, by definition, will have lower density than the liquid 2 on which it floats. There comes a point when the accumulated liquid 2 and contaminant layer 1 exert sufficient pressure at the mouth 710 for the fluid 2 inside the tube to reach the apex of the U-bend and clean liquid 2 then flows out of the outlet 71. In this way, the contaminant substance 1 is retained in the further separation chamber 75, as a floating layer progressively occupying a larger portion of the depth of the chamber 75. The further separation chamber 75 can then be emptied of contaminant 1 at suitable intervals.

In the apparatus shown in FIG. 5 the outlet from the main separation chamber 3 comprises a vertical pipe 60 having a mouth 600 communicating with collected liquid 2 at the bottom of the chamber 3. This vertical pipe 60 extends upwards, through the top 31 of the drum 30, through an outlet fitting 62. The outlet 6 from the main chamber, the first outlet 71 from the secondary chamber 75, and the second outlet 72 from the secondary chamber 75 in this embodiment are connected together so that they feed into (i.e. supply) the return pump $8^1$. Thus, the supply pumped by the return pump $8^1$ back by the return line 61 to the tank 10 comprises clean liquid 2 and air 20. The return line 61 is shown injecting the returned liquid and air directly into the body of liquid 2 in the holding tank 10. It will be appreciated that alternative arrangements may be employed in other embodiments.

Although the apparatus of FIG. 5 comprises a return pump 8', in alternative embodiments the additional, return pump may be omitted. In such embodiments, flow of clean liquid 2 from the chamber 3 back along the return line 61 may be driven simply by means of pressure developed in the chamber as a result of the combination of supply flow into the chamber, via the inlet, and restricted gas flow out of the chamber, via the venting arrangement 7. Thus, return flow may be driven by the supply pump (which may also be described as an extracting pump). Such an arrangement provides the advantage that it requires a reduced number of components. Thus, certain embodiments provide separating apparatus exactly as shown in FIG. 5, except for the omission of components 8' and 80'.

Figure 6:
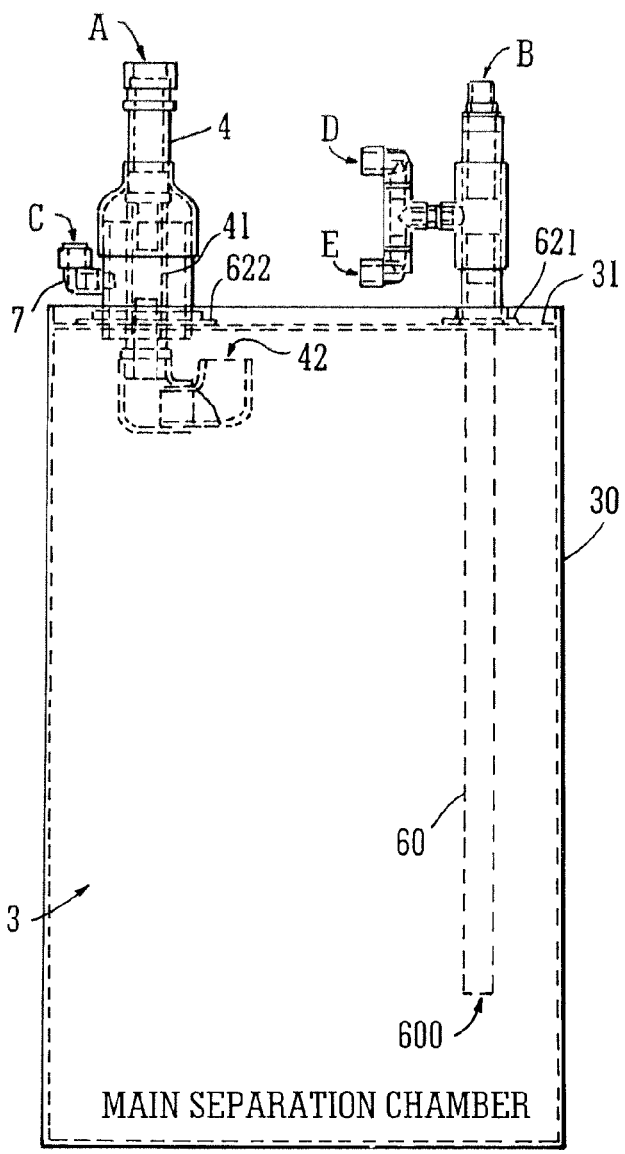
FIG. 6 is a representation of separating apparatus in accordance with another embodiment of the invention.

Referring now to FIG. 6, this shows the separating apparatus in accordance with another embodiment. The apparatus comprises a tight head drum 30 having an interior volume defining a separation chamber 3. The drum has a non-removable top 31 to which two fittings are attached. The first of these fittings 622 provides a relatively large diameter opening into the chamber 3, and the second fitting 621 provides a relatively smaller diameter opening to the chamber 3. Attached to the first fitting 622 is a combined inlet and vent assembly. This assembly includes an inlet portion 4 including a conduit 41 which extends down through the top 31, before turning through 180 degrees and terminating at a mouth 42 which is close to and faces the underside of the top 31. The conduit 41 is provided by a combination of a tube and a pair of elbow fittings. The combined inlet and vent fitting includes a cylindrical portion arranged concentrically with the tube portion of the inlet 4 and extending radially from this cylindrical portion is another elbow fitting which provides a vent to the interior of the drum, that vent having an outlet aperture C. The upper end of the cylindrical portion of the vent structure is closed, by connection to the downwardly extending tube of the inlet portion of the structure. A supply of material for separation in the chamber is supplied to aperture A of the inlet portion of the structure. An outlet from the chamber comprises a tube 60 extending down through the second fitting 621, terminating at an open mouth 600 in a lower portion of the chamber 3. A connector is attached to this tube 60 outside the drum 30, that connector having inlet apertures D and E to receive supplies of clean air and clean liquid respectively from the correspondingly labelled apertures of the air/oil/water separator illustrated in FIGS. 7 and 8. This air/oil/water separating apparatus embodies another aspect of the invention, and its operation is as described above with reference to the further separation chamber arrangement 75, 76, 70, 71, 72 in FIG. 5. Its housing 76 comprises a main portion 761 and a removable lid 762 in this example.

It will be appreciated that in certain separation methods embodying the invention, floating oil is removed from the surface of a body of water using an adjustable floating pick up. This is set to remove oil along with entrained air and some water from beneath the surface of the oil. A pump deposits this mixture into a tight head drum, for example via the larger trisure opening of a conventional drum head. Oil and water separate in the drum and water may be returned to a machine from the bottom of the drum via a standpipe that is fitted into the smaller trisure opening.

By utilising venting means, embodiments of the invention avoid the problem of entrained air being retained in the drum, which would displace liquid from the drum via the standpipe.

By utilising roller pumps, embodiments of the invention are able to avoid the problem associated with some other pump types, namely that many pumps will re-mix the oil and water into a fine oil in water dispersion, inhibiting separation (no separation will occur unless coalescence of the oil droplets occurs).

Intermittent operation of a high capacity pump enables a high oil removal rate to be achieved, whilst still allowing a reasonable residence in the drum for separation to occur.

Figure 1:
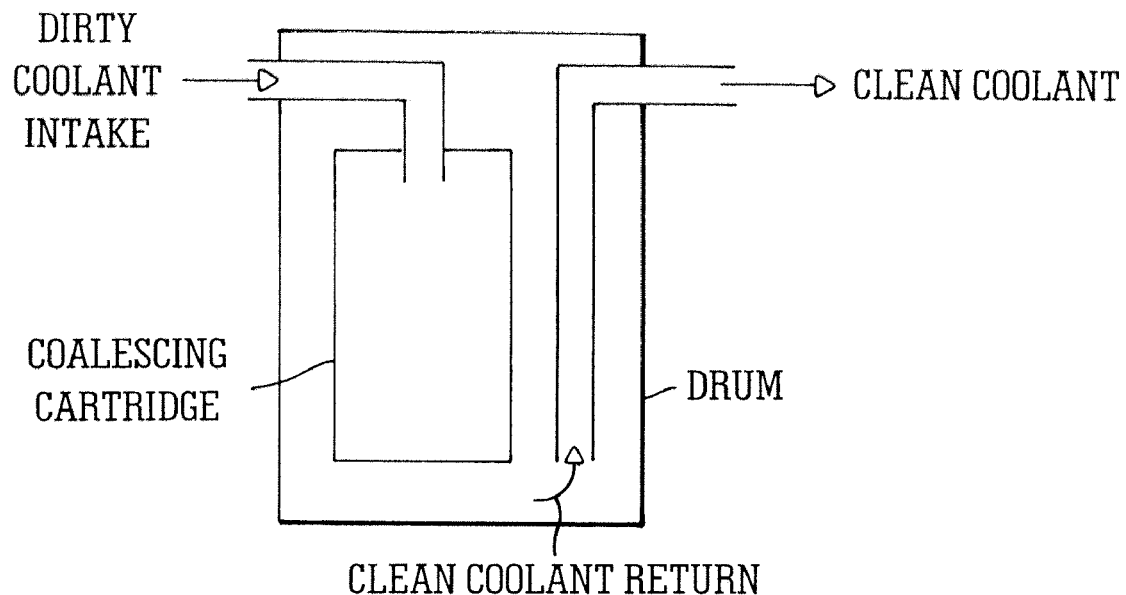
FIG. 1 is a schematic representation of known separation apparatus using coalescence techniques.
Figure 2:
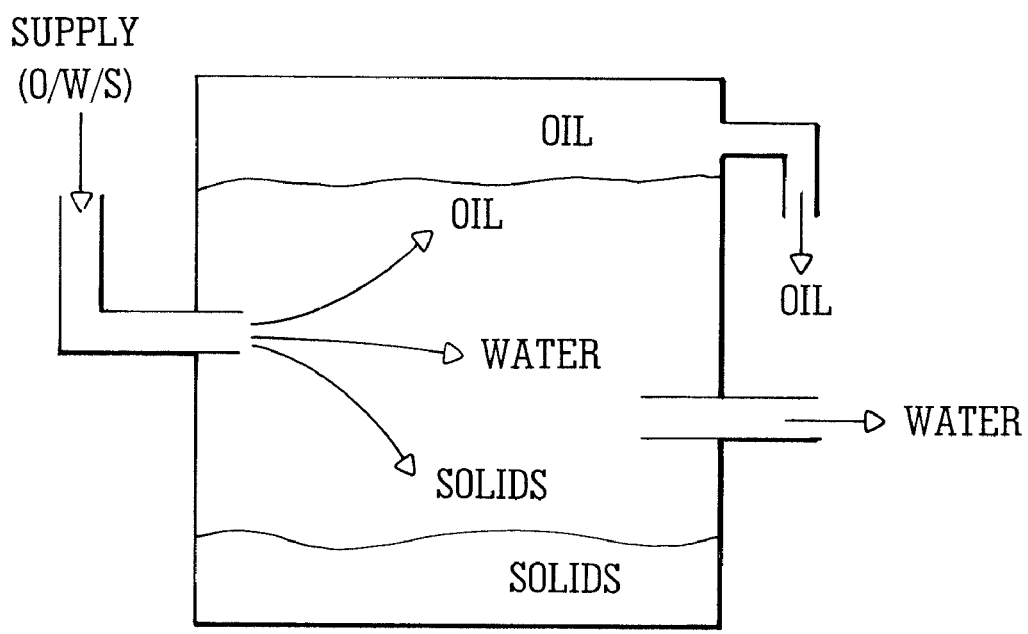
FIG. 2 is a schematic representation of a separator in accordance with the prior art.
Figure 7:
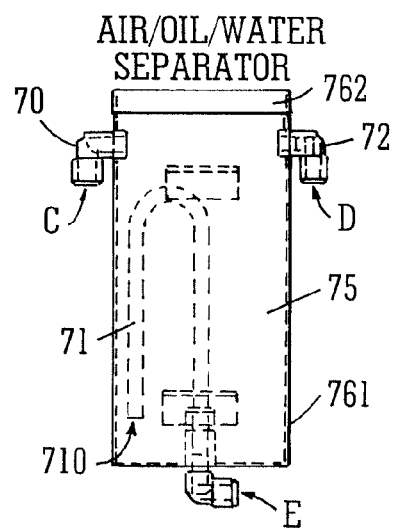
FIG. 7 is a representation of separating apparatus embodying a second aspect of the invention, and suitable for use in separating systems embodying the first aspect.
Figure 8:
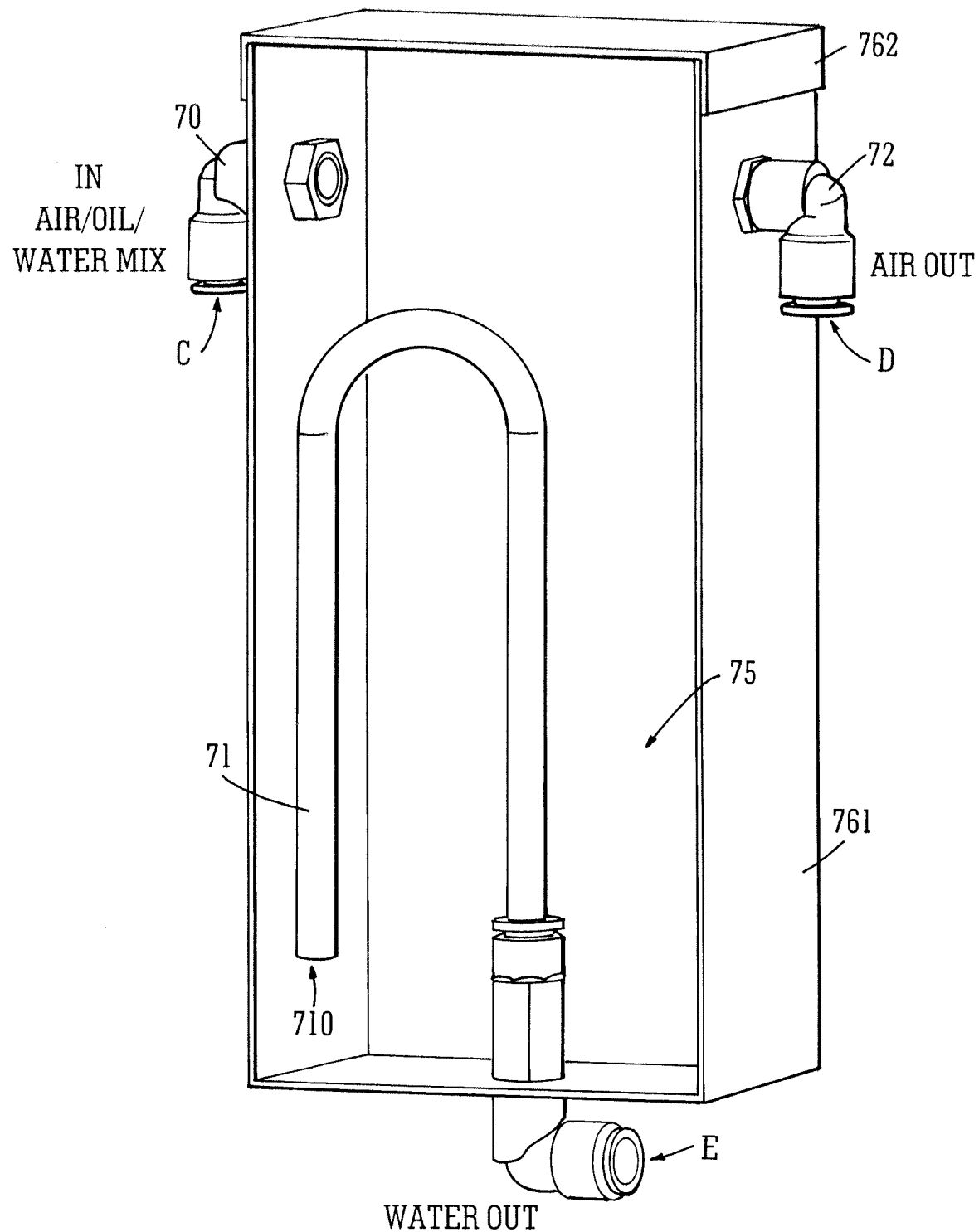
FIG. 8 is a further sectional view of the separating apparatus shown in FIG. 7.

Thus, in certain embodiments of the invention, an air vent is fitted in the drum. Preferably, this is not done simply by punching an additional hole in the top of the drum but is done by a modified inlet design. However this air must be vented. If vented to open air it will result in small but significant spillages of oil and water. This line can be routed back to a supply vessel, tank or sump, but this will impair oil removal efficiency due to the recycling of small but significant volumes of oil. To overcome this problem, certain embodiments of the invention use the arrangement of the drum/inlet/outlet/vent assembly of FIG. 6 and the air/liquid separator of FIGS. 7 and 8. Looking at those figures, it will be noted that the inlet pipe is arranged so that it discharges towards the top of the drum. This is not a typical configuration and normally, in the prior art, a separator would be designed with the inlet in the centre of the vessel as shown in the FIG. 2. However, when the floating pick up is positioned correctly a substantial amount of air is drawn into the drum. The upward facing inlet mouth 42 allows rapid disengagement of air and gentle settling of the oil and water. Air is vented from the drum via the specially designed disengagement zone. This is connected to the air/liquid separator as shown in FIGS. 7 and 8. Air leaves the separator via connection D and may be discharged back to a machine sump via the return line. Water and oil is collected in the bottom of the separator and the swan neck arrangement attached to the liquid outlet orifice E ensures that only water is returned to the machine sump via the return line. Oil is retained within the separator.

Selection of the pump type is important to the separation process in certain embodiments. In some embodiments, low shear roller pumps have been selected. This is not an obvious selection, as these pumps are not readily available and are noisy. However, these pumps are very robust and reliable and the noise problem may be overcome by use of an enclosing cabinet. Other pumps such as peristaltic and flexible vane impellor pumps may be used, but reliability can be an issue.

In certain embodiments of the invention, to overcome the inherently poor suction capabilities of low volumetric flow rate pumps, high flow rate pumps have been employed to give a good draw (for example from a machine sump), but have been coupled with an asymmetric timer that automatically switches the pump on and off. By setting the asymmetric timer correctly a sufficiently long on period can be set to achieve good oil pick up followed by a sufficiently long off period to allow oil/water separation.

Figure 9:
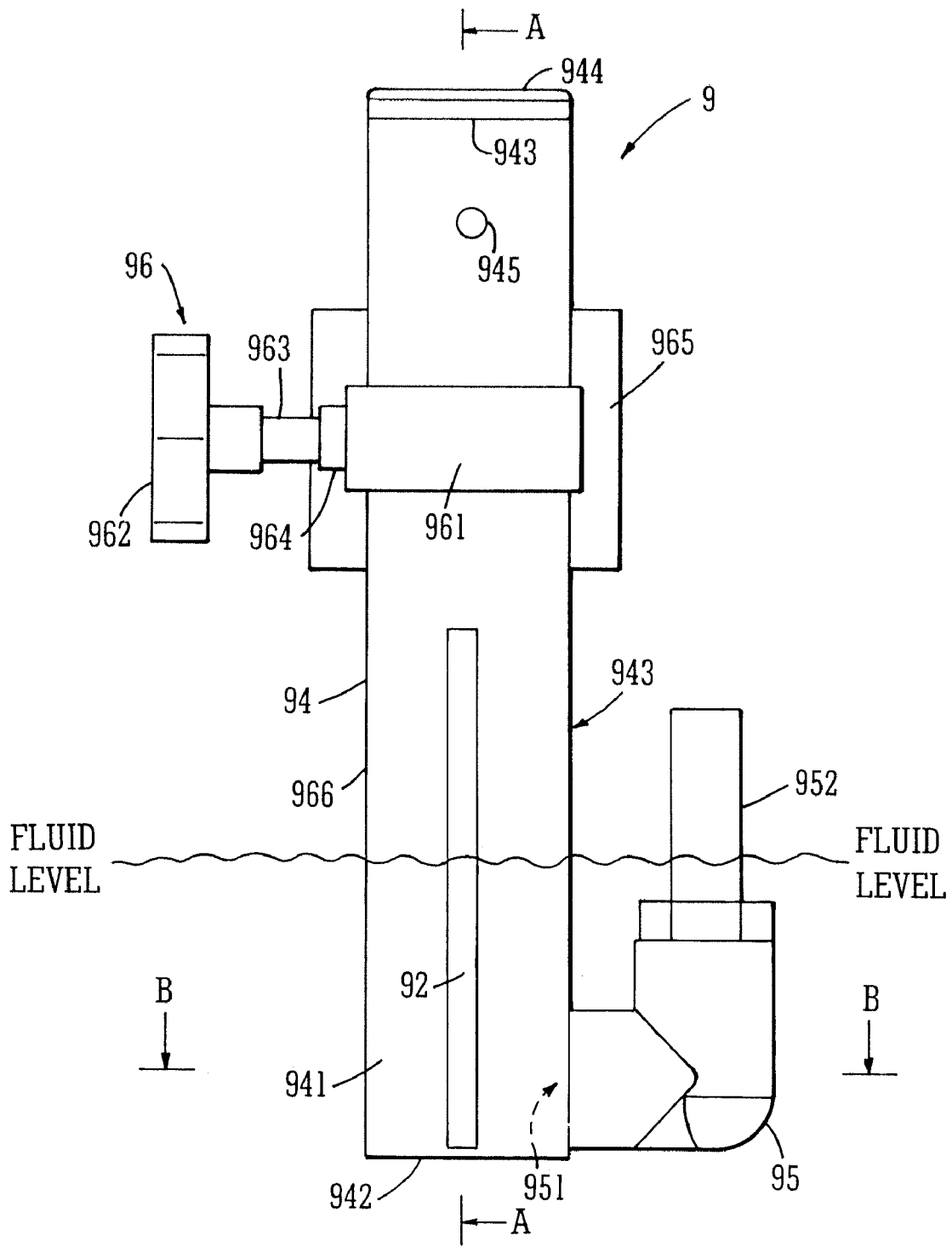
FIG. 9 is a nominal front view of a pick up embodying the invention and which can be used in separating apparatus also embodying the invention.
Figure 10:
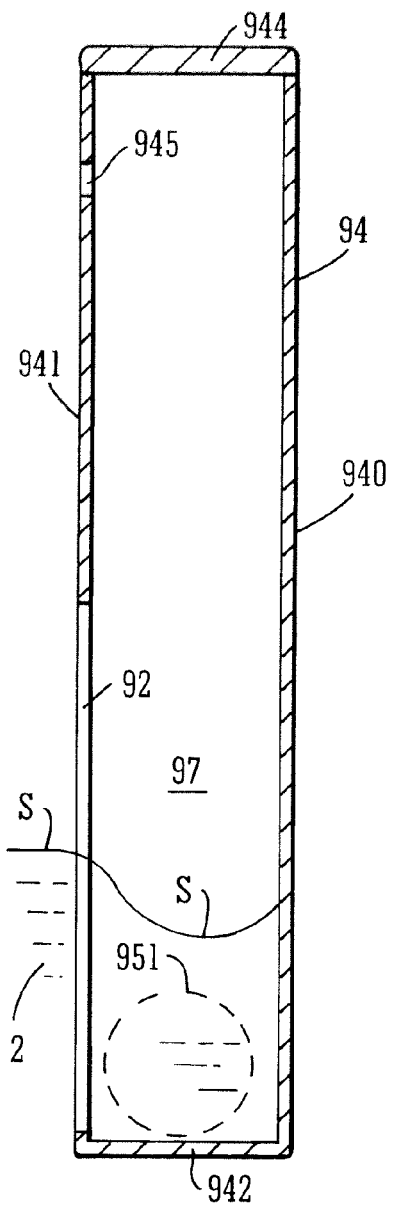
FIG. 10 is a cross section of part of the pick up of FIG. 9 along line A-A.
Figure 11:
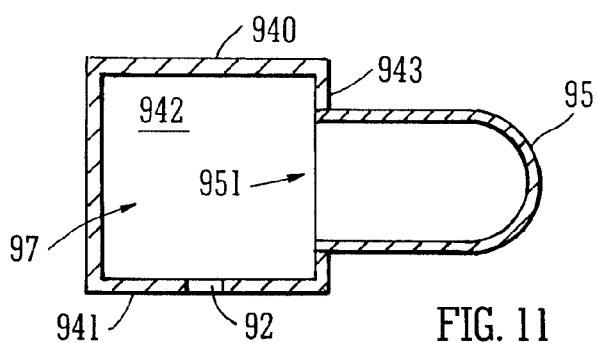
FIG. 11 is a cross section of part of the pick up of FIG. 9 along line B-B.

Separating apparatus embodying the invention and incorporating a floating pick up has been described above. However, as mentioned previously, certain embodiments utilise non-floating pick ups, and an example of one such pick up 9 is shown in FIGS. 9 to 11. The pick up 9 comprises an elongate hollow body 94, which in this particular example is a hollow, square-sectioned tube. The interior of this hollow body 94 defines a pick up chamber 97 and a pick up inlet mouth 92 in the form of an elongate slot enables a liquid and any floating substance on top of the liquid to flow into the chamber 97. The pick up 9 in FIG. 9 is shown as it would be installed in use, that is with the elongate hollow body 94 extending generally vertically upwards from its lower end 942 such that the inlet slot 92 is substantially vertical and thus at ninety degrees to the surface of the fluid in which the lower end of the pick up is immersed. The slot 92 extends approximately half-way along the length of the body 94. A pick up outlet mouth 951 is arranged adjacent to the closed lower end 942 of the hollow body 94. Through this outlet mouth 951 a supply may be drawn to a connected pump via the pick up outlet assembly 95. This outlet assembly 95 includes an elbow and a cylindrical connection section 952 to which a hose, tube, pipe or other conduit 51 can be connected to convey liquid and floating material to the pump. As will be seen from the figures, the slot 92 has a lower end which is very close to the lower end 942 of the hollow body 94. The pick up outlet mouth 951 is also arranged as close as possible to the lower end 942 of the body 94. This means that the illustrated pick up 9 is particularly suited to use in the extraction of a supply from a shallow body of liquid 2. An optimum level of fluid with respect to the inlet slot 92 is shown on the figure. Thus, at this optimum position, a lower part of the slot 92 is immersed in the liquid and an upper part of the slot 92 is in air. As mentioned above, the hollow body 94 is square in cross-section, and the slot 92 is provided in a nominal front face 941 of the tubular body 94. The pick up outlet mouth 951 is provided in an adjacent side face 943 of the tubular structure. The lower end 942 of the tube 94 is closed, and so is the upper end 943. This is closed by a cap member 944. All aperture 945 is provided in the hollow body 94 close to its upper end 943. This provides a vent to prevent siphoning and also to prevent the pump from creating a vacuum in the upper part of the body. The pick up 9 also includes adjustable support means 96 enabling the height of the hollow body 94 and hence the slot 92 to be adjusted with respect to the fluid level. This support means comprises a clamp support 965 which, in use, is attached to the vessel, tank, reservoir or other such means containing the fluid supply. Rigidly attached to this clamp support 965 is a clamp collar 961, through which the tubular member 94 passes. An internally threaded collet 964 is attached to the clamp collar 961, and an externally threaded clamp member 963 is engaged within this collet 964. A clamp knob 962 is attached to the threaded shaft 963 and, by appropriate rotation, the clamp member 963 is able to pass through the collet 964 and a corresponding hole in the clamp collar 961 to engage a side surface 966 of the tubular body 94. Thus, with the clamp member 963 loosened the tubular body 94 may be moved up or down within the collar 961 to a desired height and then the clamp member 963 can be rotated to clamp the body 94 against an inner surface of the collar 961 at the desired height. Referring now in particular to FIG. 10, this shows a cross section of the pick up body 94 and its cap 944 and also shows the level of the liquid surface S both outside the pick up and inside the pick up chamber 97. It will be appreciated that these levels are not an exact representation, but instead are generally indicative of typical levels. The illustrated levels of the surface S correspond to a situation in which a pump is connected to the pick up outlet assembly 95 and is operating, i.e. it is in the process of pumping material out of the pick up chamber 97 through the pick up outlet mouth 951, which in this example is circular. As can be seen on FIG. 10, the surface level S inside the chamber 97 dips down below the surface level outside the chamber. This results from the combination of the pumping rate (i.e. the rate at which material is extracted from the chamber) and the geometry of the pick up inlet mouth 92. As in this example the inlet mouth 92 is a narrow slot, flow of liquid and any floating contaminant into the pick up chamber 97 is restricted. Thus, by selecting a suitable combination of inlet mouth 92 geometry and outlet mouth 951 size and pumping rate, the surface level can be made to have a form generally as shown in FIG. 10 and this provides the advantage that it encourages any material floating on the surface S of liquid outside the pick up chamber 97 to flow through the slot 92 and down into the pick up chamber 97. In other words, the combination of factors, including an inlet slot 92 and relatively large outlet mouth 951 improves the pick up's ability to extract floating material. In effect, the relatively narrow slot 92 results in the formation of a weir. In certain embodiments of the invention, the width of the slot 92 is in the region of six millimetres, and the slot's height is approximately ten centimetres. It will be appreciated, however, that alternative embodiments may utilise slots having different dimensions. Also, although the illustrated example has just one, parallel-sided slot, alternative embodiments may comprise more than one slot, and the slot or slots may have different shapes (i.e. other than generally rectangular, parallel sided). For example, certain embodiments utilise tapered slots. The slots in alternative embodiments are not necessarily vertical in use, but it is advantageous that the slots do have an extent in the vertical direction even if they are not perpendicular to the liquid surface. In general terms, the pick up arrangement shown in FIGS. 9-11 when used in conjunction with an appropriate pump has the ability to empty faster than it fills. This means that the liquid surface level inside the pick up can be depressed with respect to the level outside, and this encourages liquid, and especially any floating material, to flow into the pick up. The illustrated pick up 9 is particularly suited for use in the extraction of a supply from a shallow sump.

Figure 12:
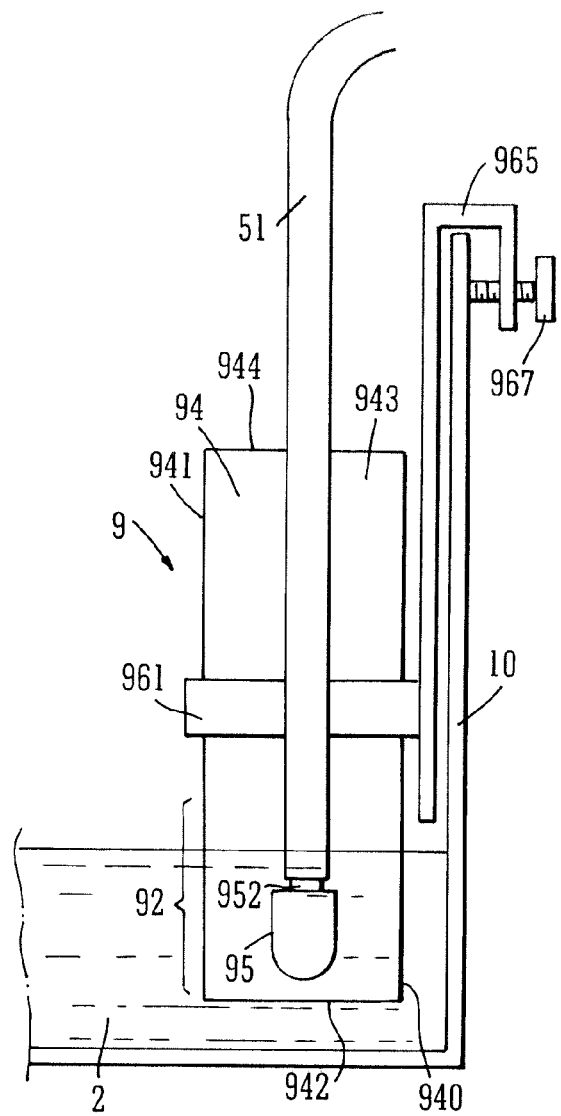
FIG. 12 is a schematic side view of a pick up of type shown in FIGS. 9-11 installed in a tank.

Referring now to FIG. 12, this is a schematic side view of a pick up of the type shown in FIGS. 9-11 installed with respect to a tank 10 containing a quantity of liquid 2. The clamp support 965 is adapted to hook over a side wall of the tank 10 and is clamped in place by means of a threaded clamp bolt 967. The elongate body 94 has been clamped inside the clamp collar 961 at a height such that a portion of its inlet slot 92 on its front face 941 is immersed in the liquid 2, and remaining portion extends above the liquid surface. As can be seen, attached to the pick up outlet assembly 95 on the side face 943 of the body 94 is a hose 51. Although not shown in the figure, this hose is connected to a pump which is operable to draw the supply through the pick up 9. The positioning of the pick up outlet assembly 95 on a side surface of the hollow body 94 provides the advantage that it does not interfere with the installation of the pick up against the side wall of the tank 10. At the same time, the positioning of the inlet slot 92 on a nominal front face 941 of the body 94 provides the advantage that it faces the main body of liquid 2 inside the tank 10 and so is able to provide improved performance with respect to the extraction of floating contaminants or other floating substances.

Figure 13:
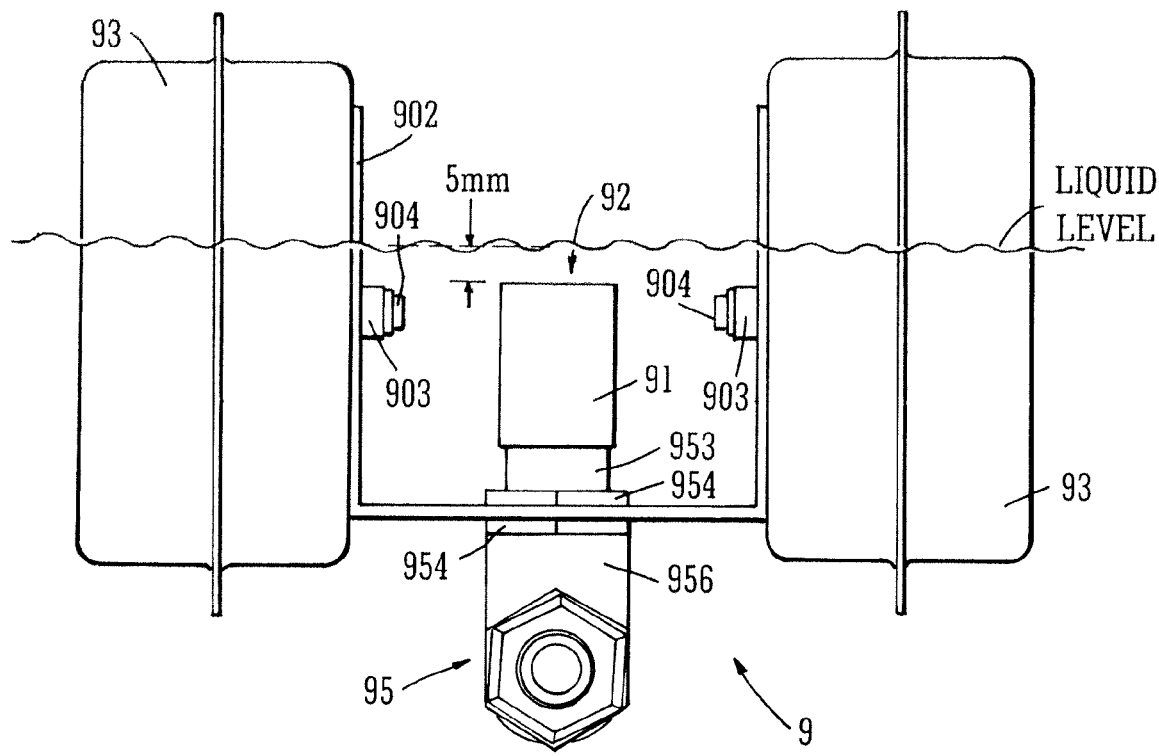
FIG. 13 is a nominal rear view of a floating pick up embodying the invention and usable in separating apparatus also embodying the invention.
Figure 14:
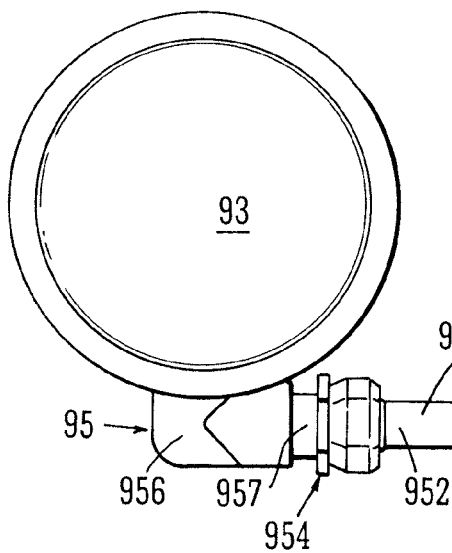
FIG. 14 is a side view of the pick up from FIG. 13.
Figure 15:
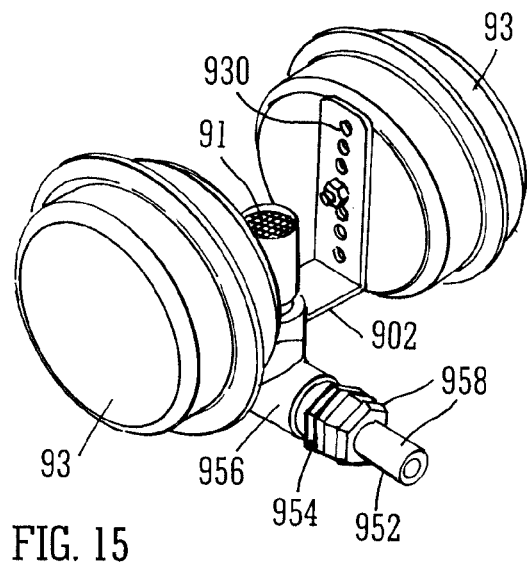
FIG. 15 is a perspective view of the pick up of FIGS. 13 and 14.
Figure 16:
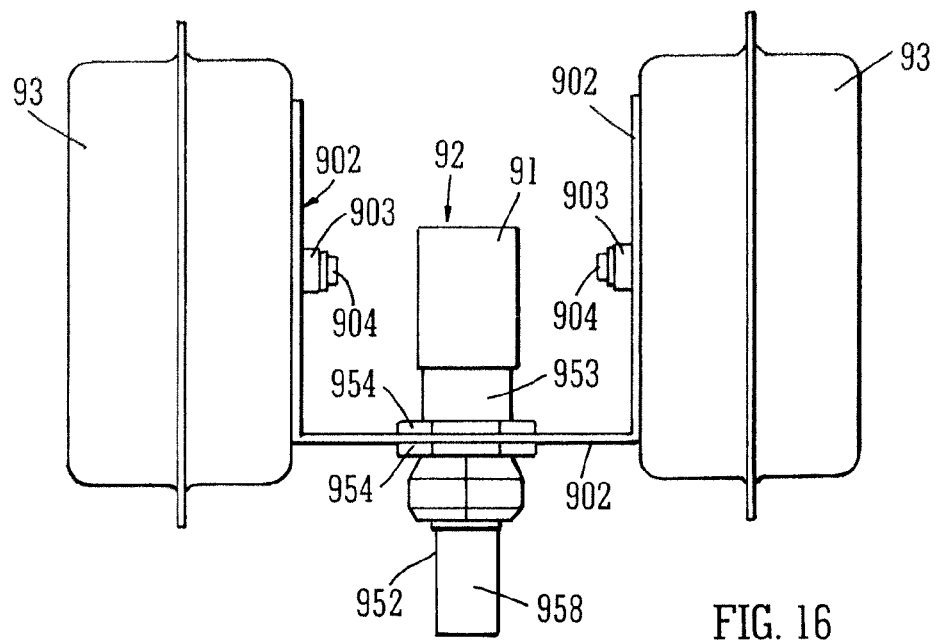
FIG. 16 is a nominal plan view of another floating pick up embodying the invention and usable in separating apparatus also embodying the invention.
Figure 17:
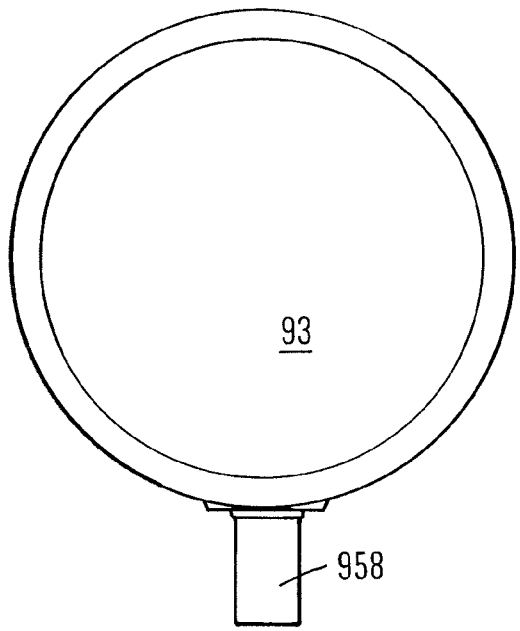
FIG. 17 is a side view of the pick up from FIG. 17.
Figure 18:
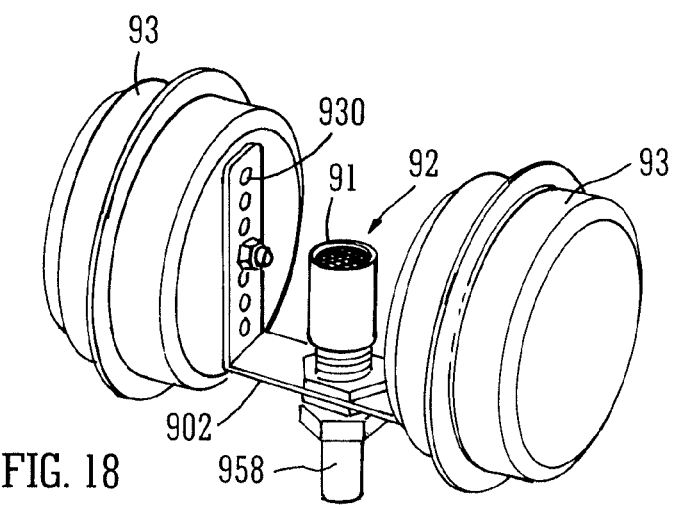
FIG. 18 is a perspective view of the pick up of FIGS. 16 and 17.

Referring now to FIGS. 13 to 15, these show a floating pickup embodying the invention and which may be used with separating apparatus embodying the invention, such as that shown in FIGS. 3 and 5, for example. The floating pickup 9 comprises two floats 93 which are each attached to a supporting yoke 902. Each float 93 is generally cylindrical, having been formed by connecting together two can-shaped halves. Where the halves are joined there is a seam or flange. The floats 93 are arranged such that their longitudinal axes are generally co-linear, the floats being attached to parallel side arms of the yoke 902, which is generally U-shaped. The floating pickup also comprises an inlet member 91 and an outlet assembly 95. The outlet assembly 95 comprises a threaded elbow 956 which is rigidly connected to the yoke 902 (passing through a hole in the base of that yoke 902) by means of lock nuts 954. An externally threaded conduit nipple 953 extends upwardly from the threaded elbow 956 into the space between the floats 93, and the inlet member 91 is located on that threaded nipple 953. The inlet member 91 is generally cylindrical, having an internal screw thread which engages the external thread on the nipple 953. Although the nipple 953 is fixed with respect to the position of the floats 93, the position of the inlet mouth 92 at the upper end of the inlet member 91 is adjustable by means of rotating the inlet member 91 with respect to the nipple 953. Thus, this enables fine adjustment to be made of the height of the inlet mouth 92 relative to the surface of a liquid on which the pickup floats. In FIG. 13 this height has been adjusted so that the mouth 92 is approximately five millimetres below the surface liquid level. Moving away from the inlet, on the other side of the yoke the threaded elbow connects to another conduit nipple 957. Another lock nut 954 is attached to that nipple 957, and then a swivel hose tail 958 connects to the nipple 957. This swivel hose tail 958 includes a generally cylindrical section 952 to which a suitable conduit (such as a hose, pipe, tube or other such means) may be connected. The cylindrical section 952 is able to rotate in its seat, thereby providing the ability for the float and inlet assembly to rotate with respect to an attached hose. This enables the floating pickup to self-level on the liquid on which it floats. This is advantageous because, when a generally horizontal hose is connected to the connection means 952, the floating pickup adopts the position shown generally in FIG. 13, with the inlet mouth 92 directed upwardly, just below the surface of the liquid level, thereby entabling floating material to be sucked into the inlet from the full 360° range of positions around the mouth.

As can be seen even from FIG. 15, each float 93 is connected to the yoke 902 by means of a threaded stud 904 connected to one side of the float and arranged to extend through one of a series of holes 930 in the side arm of the yoke 902. In this particular example each side arm of the yoke 920 has a line of seven attachment holes 930. The holes on opposite sides of yoke 930 are aligned with each other, and typically the two floats 93 will thus be attached with their threaded studs 904 level, through the corresponding pair of holes in the yoke. Locking nuts 903 are engaged on the threaded studs 904 to secure the floats 93 to the yoke 902. It will be appreciated that by appropriate selection of the holes 930 in which the studs 904 of the floats 93 are to be attached, relatively coarse adjustment of the position of the inlet 91 (and in particular the inlet mouth) relative to the surface of the liquid on which the pickup floats can be achieved. This coarse adjustment is thus independent of the fine adjustment provided by rotation of the inlet 91 with respect to the threaded nipple 953. In the present example, it will be appreciated that, in use, the outlet structure 95 extends below the floats 93. As such, it is best suited to operation in relatively deep bodies of liquid, and in such applications the ability of the inlet mouth 92 to take in floating material over a 360° range is particularly advantageous. It will also be appreciated that by locating the inlet mouth 92 in between the pair of floats 93, some protection of the inlet is afforded.

Figure 19:
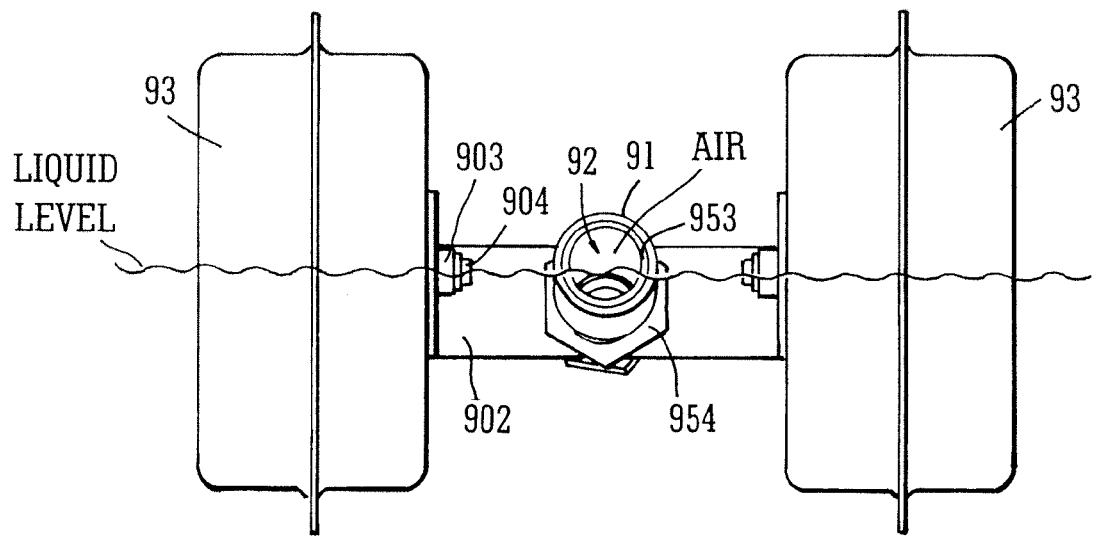
FIG. 19 is a nominal front view of the pick up of FIGS. 16-18 in use.
Figure 20:
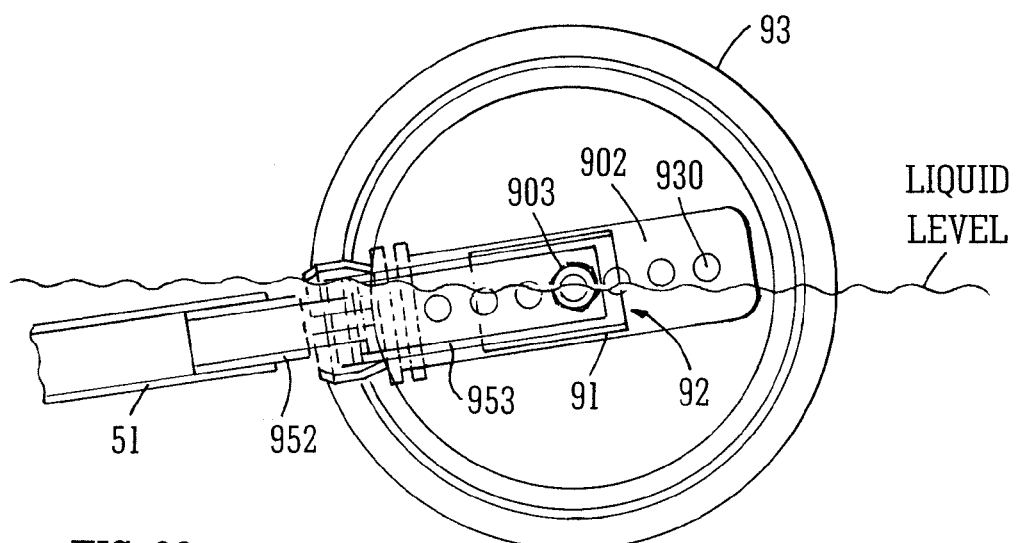
FIG. 20 is a side view, partly in cross section, of the pick up of FIGS. 16-19 in use.

Moving on now to FIGS. 16 to 20, these show another floating pickup embodying the invention and again which may be used with separating apparatus embodying the invention. The construction of this floating pickup is similar to that of the pickup of FIGS. 13-15, and corresponding components are given the same reference numerals and will not be described again in detail. A difference between the pickup of FIGS. 16-20 compared with that of FIGS. 13-15 is, however, that its outlet assembly 95 does not comprise a threaded elbow. Instead, the swivel hose tail 958 incorporating the rotatable cylindrical connection member 952 extends generally in line with the inlet 91, from the opposite side of the yoke 902. FIGS. 19 and 20 show this alternative floating pickup in use, with the swivel hose tail 958 connected to a generally horizontal conduit 51. As can be seen, the coarse adjustment means and fine adjustment means have been used to position the inlet mouth 92 such that it is partially beneath the surface of the liquid on which the assembly floats, and partially above, so that an attached pump can draw in a substantial quantity of air together with floating material and liquid. The liquid/air mix may, for example, be 50/50. This arrangement is particularly suited for use in the extraction of floating material from a relatively shallow sump, as the outlet assembly does not protrude below the floats when the substantially horizontal conduit 51 (e.g. hose) is attached.

From the above description, the following advantages of certain embodiments of the invention will be appreciated.

Separation systems embodying the invention can work without the aid of coalescence, and may be fully enclosed.

Tanks equipped with coalescers have a tendency to block over intermittent and irregular periods, but, in contrast, systems embodying the invention (such as the drum-based systems) can be serviced on a regular period dictated by the quantity of oil generated by the application.

Open tanks fed by small feed pumps can smell and will have poor up take of oil. In contrast, certain systems embodying the invention are fully enclosed, preventing smells, and use a high flow pump with an asymmetric timer, allowing a good oil removal rate and reducing the occurrences of blockages and breakdowns.

The air/liquid separator on the vent of the main chamber allows the use of an enclosed drum, whereas other systems using fully enclosed drums would gradually empty if a large volume of air was moved. To achieve maximum oil removal it is important to set the floating pick up high in the water thus entraining substantial amounts of air. This large amount of air causes no problems, when the vent and associated additional separator are used. If a non-floating pick up is used, its mouth is preferably arranged such that part is immersed in the liquid and part is above the liquid surface, in air. Advantageously, this can be achieved for a variety of liquid surface heights, even with a fixed pick up, if the pick up inlet mouth comprises a vertically extending slot.

Embodiments of the invention avoid the problems associated with systems using hydrophobic ropes, bands and discs. Such systems do not work well over a long period of time as they rely on weak attractive forces. They also struggle to remove oil from the extremities of the machines, as there is no flow returned to the machine.

Skimming equipment embodying the invention may utilise a drum to collect oil, and the drum may simply be swapped for a new one when full, or at a service interval.

Embodiments comprising floating pick ups have been described above, as have other embodiments that utilise different, non-floating pick ups or inlet structures through which the supply is fed to the inlet of the separation chamber. For example, the pick up structure may comprise an aperture or plurality of apertures arranged at a fixed position or positions in (or relative to) a supply tank, vessel, sump, or any other suitable, liquid collecting/holding arrangement. Thus, certain embodiments utilise a static pick up structure, through which the supply pump may draw the supply.

Further advantages associated with embodiments of the invention, particularly with drum-based separation apparatus using a single pump for extraction and return, are that they provide simple and compact separation apparatus which may, for example, be located close to a machine having a sump from which a contaminant is to be drawn and separated out. This is in contrast to more complicated prior art systems using coalescence or centrifugal techniques, which tend to have larger footprints and may require locating relatively remotely from the apparatus from which the contaminant is to be removed. Thus, embodiments can provide compact extraction and separation systems, at reduced cost compared with bulkier, more complicated prior art systems.

The invention claimed is:

1. Separating apparatus for separating a substance from a liquid on which the substance can float, the apparatus comprising:
    a separation chamber;
    an inlet adapted to convey a supply comprising the substance and the liquid into the separation chamber, wherein the inlet is arranged such that in use the supply emerging from the inlet into the separation chamber is directed upwardly into the separation chamber;
    an outlet adapted to convey liquid collected in the separation chamber out of the separation chamber;
    venting means arranged to convey gas out of the separation chamber;
    a pump arranged to pump the supply into the separation chamber via the inlet; and
    a pick up connected to the pump and through which the pump can draw the supply, the pick up comprising:
        a pick up chamber;
        a pick up inlet mouth adapted to admit the supply into the pick up chamber;
        a pick up outlet mouth adapted to convey the supply from the pick up chamber to the pump,
        wherein the pick up is arranged at a fixed height such that a supply fluid level falls with respect to the pick up inlet mouth when the pump is operated,
        whereby the pick up inlet mouth is configured so as to restrict the supply flowing into the pick up chamber when the pump is operated such that the fluid level inside the pick up chamber is lower than the supply fluid level outside and flow of the substance into the pick up chamber is thereby encouraged with respect to a flow of the liquid into the pick up chamber.

2. Separating apparatus in accordance with claim 1, wherein the inlet comprises a mouth, out of which the supply emerges into the separation chamber, said mouth facing upwardly.

3. Separating apparatus in accordance with claim 2, wherein the mouth is arranged in an upper portion of the separation chamber.

4. Separating apparatus in accordance with claim 2, wherein the separation chamber is provided in a vessel having a top, defining an upper extent of the separation chamber, and a base, defining a lower extent of the separation chamber, and the mouth is arranged proximate the top.

5. Separating apparatus in accordance with claim 1, wherein the outlet is arranged to extract liquid from a lower portion of the separation chamber.

6. Separating apparatus in accordance with claim 1, wherein the outlet comprises a downward facing mouth, through which liquid is extracted from the separation chamber.

7. Separating apparatus in accordance with claim 6, wherein the separation chamber is provided in a vessel having a top, defining an upper extent of the separation chamber, and a base, defining a lower extent of the separation chamber, and the outlet mouth is arranged proximate the base.

8. Separating apparatus in accordance with claim 1, wherein the inlet and venting means are arranged such that there is no straight-line path by which material emerging into the separation chamber from the inlet may be conveyed out of the separation chamber via the venting means.

9. Separating apparatus in accordance with claim 1, comprising a drum, and wherein the separation chamber is provided by an interior volume of the drum.

10. Separating apparatus in accordance with claim 9, wherein the drum has a base, on which the drum stands in use, and a top.

11. Separating apparatus in accordance with claim 10, wherein the inlet is arranged to convey said supply down through the drum top and into the separation chamber.

12. Separating apparatus in accordance with claim 11, wherein the inlet comprises a U-shaped conduit arranged to convey said supply downwardly from the drum top and then to divert the supply back upwards towards the top.

13. Separating apparatus in accordance with claim 11, wherein the inlet is arranged to direct the supply emerging from the inlet into the separation chamber at an underside of the drum top.

14. Separating apparatus in accordance with claim 10, wherein the outlet is arranged to convey liquid up through the drum top and out of the separation chamber.

15. Separating apparatus in accordance with claim 14, wherein the outlet comprises a conduit extending downwardly from the drum top into the separation chamber, said outlet conduit having a mouth, through which liquid may be extracted from the separation chamber, proximate the drum base.

16. Separating apparatus in accordance with claim 15, wherein the outlet mouth faces downwards.

17. Separating apparatus in accordance with claim 15, wherein the outlet conduit comprises a vertical pipe.

18. Separating apparatus in accordance with claim 10, wherein the venting means is arranged to convey gas up through the drum top.

19. Separating apparatus in accordance with claim 1, wherein the pump is a roller pump.

20. Separating apparatus in accordance with claim 1, further comprising a pump controller arranged to operate the pump according to a cycle comprising an on period and an off period.

21. Separating apparatus in accordance with claim 20, wherein the off period is longer than the on period.

22. Separating apparatus in accordance with claim 20, wherein the pump controller comprises means for adjusting the relative lengths of the on and off periods.

23. Separating apparatus in accordance with claim 20, wherein the pump controller comprises means for adjusting the frequency of the cycle.

24. Separating apparatus in accordance with claim 1, wherein the pick up inlet mouth comprises a slot.

25. Separating apparatus in accordance with claim 24, wherein the pick up is adapted such that, in use, said slot extends vertically.

26. Separating apparatus in accordance with claim 25, wherein the pick up is adapted such that, in use, the pick up outlet mouth is proximate a lower end of the slot.

27. Separating apparatus in accordance with claim 1, wherein the pick up outlet mouth is substantially circular.

28. Separating apparatus in accordance with claim 1, further comprising: a reservoir adapted to hold a quantity of said liquid and said substance; and a partition arranged to separate the reservoir from said pick up chamber, wherein the pick up inlet mouth comprises an aperture in said partition.

29. Separating apparatus in accordance with claim 1, wherein the pick up comprises a hollow body and the pick up chamber is a volume inside said body.

30. Separating apparatus in accordance with claim 29, wherein the hollow body is elongate and the pick up inlet mouth comprises a slot extending along the body from a position proximate a first end of the hollow body.

31. Separating apparatus in accordance with claim 30, wherein the pick up outlet mouth is arranged proximate said first end.

32. Separating apparatus in accordance with claim 30, wherein the first end of the hollow body is closed.

33. Separating apparatus in accordance with claim 30, wherein the pick up further comprises support means for supporting the hollow body in a reservoir such that said first end is lowermost and the body extends substantially vertically from said first end.

34. Separating apparatus in accordance with claim 33, wherein the support means comprises adjustment means for adjusting a height at which the hollow body is supported in the reservoir.

35. Separating apparatus in accordance with claim 29, wherein the hollow body is tubular.

36. Separating apparatus in accordance with claim 35, wherein the tubular hollow body has a generally rectangular cross section, the pick up inlet mouth comprises a slot in one face of the tubular body, and the pick up outlet mouth comprises an aperture in an adjacent face of the tubular body.

37. Separating apparatus in accordance with claim 1, further comprising a reservoir adapted to hold a quantity of said liquid and said substance, and wherein the pump is arranged to pump said supply to the separation chamber from the reservoir.

38. Separating apparatus in accordance with claim 37, further comprising a return conduit, connected to the outlet and arranged to convey liquid back into the reservoir.

39. Separating apparatus in accordance with claim 38, comprising a further pump arranged to pump liquid out of the separation chamber to the reservoir, via the outlet and the return conduit.

40. Separating apparatus in accordance with claim 1, comprising:
a further separation chamber;
a further inlet connected to the venting means and adapted to convey gas and any entrained substance or liquid conveyed out of the separation chamber by the venting means into the further separation chamber to emerge in an upper portion of the further separation chamber;
a first outlet adapted to convey liquid collected in a lower portion of the further separation chamber out of the further separation chamber; and a second outlet adapted to convey gas from an upper portion of the further separation chamber, out of the further separation chamber.

41. Separating apparatus in accordance with claim 40, wherein the first outlet has a mouth arranged in communication with said lower portion of the further separation chamber, and the first outlet is adapted to inhibit flow of collected liquid out of the further separation chamber until the head of collected liquid and substance above the mouth exceeds a predetermined value.

42. Separating apparatus in accordance with claim 40, wherein the first outlet comprises a inverted U-shaped conduit, having a downward facing mouth in communication with the lower portion of the further separation chamber and through which fluid can be conveyed out of the further separation chamber.

43. Separating apparatus in accordance with claim 40, wherein the first outlet and second outlet from the further separation chamber are connected to the outlet from the separation chamber.

44. Apparatus for separating a supply comprising a gas, a substance, and a liquid on which the substance can float, the apparatus comprising:
a separation chamber;
an inlet adapted to convey the supply into the separation chamber to emerge in an upper portion of the chamber;
a first outlet adapted to convey liquid collected in a lower portion of the separation chamber out of the separation chamber;
a second outlet adapted to convey gas from an upper portion of the separation chamber, out of the separation chamber,
venting means arranged to convey gas out of the separation chamber;
a pump arranged to pump the supply into the separation chamber via the inlet; and
a pick up connected to the pump and through which the pump can draw the supply, the pick up comprising:
a pick up chamber;
a pick up inlet mouth adapted to admit the supply into the pick up chamber;
a pick up outlet mouth adapted to convey the supply from the pick up chamber to the pump,
whereby the pick up is arranged at a fixed height such that a supply level falls with respect to the pick up inlet mouth when the pump is operated, and whereby the pick up inlet mouth is configured so as to restrict the supply flowing into the pick up chamber when the pump is operated such that the fluid level inside the pick up chamber is lower than the supply fluid level outside and the flow of the substance into the pick up chamber is thereby encouraged with respect to the flow of the liquid into the pick up chamber, and
wherein the first outlet has a mouth arranged in communication with said lower portion of the separation chamber, and the first outlet is adapted to inhibit flow of collected liquid out of the separation chamber until the head of collected liquid and substance above the mouth exceeds a predetermined value.

45. Apparatus in accordance with claim 44, wherein the first outlet comprises a conduit extending upwardly from said mouth to a first level, said first level being below a level at which the supply emerges from the inlet and below a level at which gas enters the second outlet.

46. Apparatus in accordance with claim 44, wherein the first outlet comprises an inverted U-shaped tube.

47. Apparatus in accordance with claim 46, wherein the tube has a mouth inside the separation chamber, and conveys fluid upwardly from the mouth and then downwardly out of the separation chamber, through a base of the separation chamber.

48. Separating apparatus in accordance with claim 1, further comprising,
a supply container configured to retain the supply fluid,
wherein the pick up includes a body that defines the pick up chamber, and
wherein the body of the pick up is arranged at a fixed height with respect to the supply container.

49. Separating apparatus in accordance with claim 48,
wherein the pick up inlet mouth includes an elongated slot that extends through the body,
wherein the elongated slot includes a lower portion and an upper portion, and
wherein the body is arranged at the fixed height with respect to the supply container such that when the supply fluid level is at a position, the lower portion of the elongated slot is immersed in the liquid and the upper portion of the elongated slot is in air.

50. Separating apparatus in accordance with claim 49,
wherein the elongated slot of the pick up inlet mouth extends generally vertically upwards such that the slot is substantially normal to a top surface of the supply fluid.

51. Separating apparatus in accordance with claim 49, wherein the elongated slot is configured to form a weir.

* * * * *